United States Patent [19]

Hattori et al.

[11] Patent Number: 5,971,887
[45] Date of Patent: Oct. 26, 1999

[54] INFINITELY VARIABLE TRANSMISSION

[75] Inventors: Masashi Hattori; Hirofumi Nozawa, both of Anjo, Japan

[73] Assignee: Aisin AW Co., Ltd., Anjo, Japan

[21] Appl. No.: 08/947,876

[22] Filed: Oct. 9, 1997

[30]     Foreign Application Priority Data

Oct. 9, 1996 [JP] Japan ................................. 8-287407

[51] Int. Cl.[6] .............................. F16H 37/02; F16H 9/00
[52] U.S. Cl. ............................................... 477/41; 477/48
[58] Field of Search ................................ 477/41, 45, 48

[56]         References Cited

U.S. PATENT DOCUMENTS 5,662,547  9/1997  Moroto et al. ............................ 477/48
 5,669,846  9/1997  Moroto et al. ............................ 477/45

FOREIGN PATENT DOCUMENTS 6-331000  11/1994  Japan .

*Primary Examiner*—Dirk Wright
*Attorney, Agent, or Firm*—Oliff & Berridge, PLC

[57]            ABSTRACT

A continuously variable transmission (CVT) has an increased speed of convergence on a neutral point by combining the rotation from the CVT and a constant velocity mechanism. At the neutral point the output member has zero rotation due to torque circulation. When a neutral state is determined to be needed based on the signals indicating the pulley ratio is within a predetermined range, with the throttle pedal being off or not depressed, and the brake pedal being on, the neutral control starts an operation to control the shaft force of both the primary and the secondary pulleys for the CVT. At the same time, the engine output is controlled by controlling the throttle opening degree and a predetermined torque is transmitted to the input shaft. As a result, the CVT converges on the gear neutral point (GN) at high speed due to an increase in the input torque of the CVT based on an increase in engine torque.

9 Claims, 19 Drawing Sheets

| CLUTCH \ RANGE | $C_L$ | $C_H$ |
|---|---|---|
| P | | |
| R | O | |
| N | | |
| D — LOW | O | |
| D — HIGH | | O |

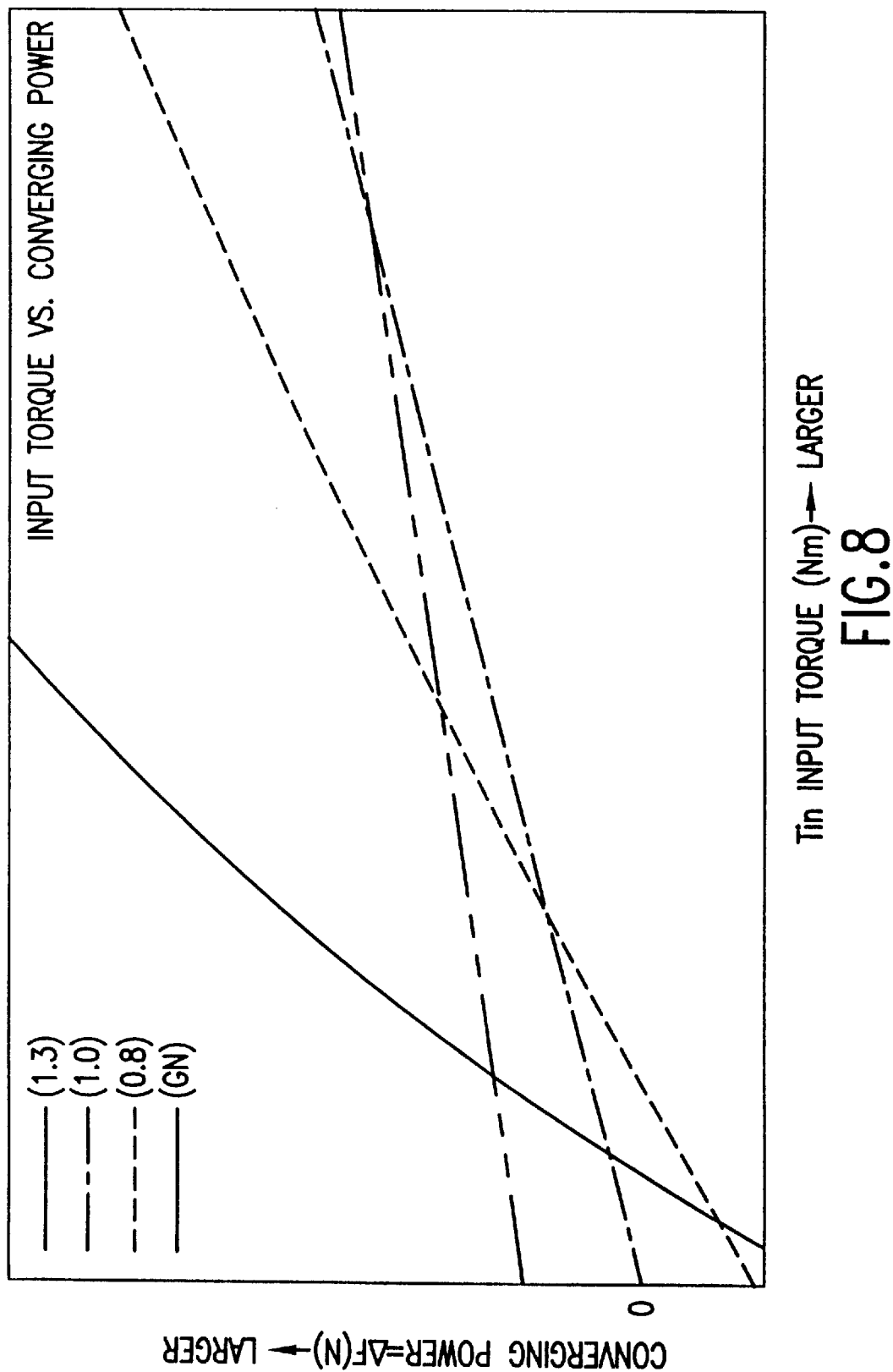

INFINITELY VARIABLE TRANSMISSION

BACKGROUND OF THE INVENTION

1. Field of Invention

The invention relates to an infinitely variable transmission that generates torque circulation by combining a continuously variable transmission apparatus with planetary gears. In particular, the invention relates to an infinitely variable transmission that uses a belt type continuously variable transmission apparatus well suited for being mounting on a vehicle and that creates a neutral state with an output member having no rotation by means of the torque circulation.

2. Description of Related Art

Automatic transmissions integrating a belt type continuously variable transmission apparatus (CVT) have been receiving attention as vehicle transmissions due to demand for improved fuel consumption rates and improved driving performance As disclosed in Japanese Laid-Open Patent Publication 6-331000, an infinitely variable transmission comprises a continuously variable transmission mechanism, a constant speed mechanism and a planetary gear system wherein torques from said continuously variable transmission mechanism and from said constant speed mechanism are combined in said planetary gear system and a torque circulation is generated in the continuously variable transmission mechanism in order to increase the range of transmission ratios. The infinitely variable transmission transmits engine output to a carrier through the constant speed mechanism as well as transmitting to a sun gear through the continuously variable transmission mechanism and a first (low) clutch. In this state, a torque circulation is generated in the continuously variable transmission mechanism and the transmission ratio of the infinitely variable transmission as measured by the ratio of the rotation of the output shaft over input shaft rotation changes from reverse to a large forward ratio (U/D) to a small forward ratio (O/D) with the transmission ratio of the continuously variable transmission mechanism changing from small (O/D) to large (U/D). By releasing said first clutch or a one-way clutch and by engaging a second (high) clutch, the rotations of the continuously variable transmission mechanism are directly transmitted to the output shaft, and the transmission ratio of the infinitely variable transmission changes from large (U/D) to small (O/D) with the transmission ratio of said continuously variable transmission mechanism changing from large (U/D) to small (O/D).

With an infinitely variable transmission that executes the above mentioned torque circulation, a gear neutral position where the number of rotations of the output shaft becomes 0, can be calculated in theory by assigning a predetermined value, which is determined from the gear ratio of the planetary gear mechanism, to the transmission ratio of the continuously variable transmission mechanism. Hence, in theory, the mechanism works without a starting apparatus such as a starter.

However, with the infinitely variable transmission discussed above, although in theory a gear neutral point may exist, the output torque diverges rapidly towards infinity in the vicinity of the neutral point, causing the output torque to fluctuate greatly with a slight deviation from the predetermined transmission ratio which makes the continuously variable transmission mechanism approach the above-mentioned neutral point. Hence, in reality, it is very difficult to establish and maintain the pulley ratio of the continuously variable transmission at a target transmission ratio to achieve the above-mentioned neutral point by controlling oil pressure and the like, to regulate the shaft force being applied to both pulleys of the belt type continuously variable transmission apparatus.

SUMMARY OF THE INVENTION

In order to overcome the above-discussed problems with conventional transmissions, the present invention includes an infinitely variable transmission (IVT) in which a belt type continuously variable transmission apparatus converges automatically to the above-mentioned gear neutral position as a result of controlling the shaft force which is applied to each of the primary and the secondary pulleys within a predetermined range.

A neutral (N) control that converges automatically to the neutral point may be achieved by controlling the shaft forces of the primary and the secondary pulleys to become substantially equal. Alternatively, the difference of the shaft forces of the primary and the secondary pulleys is made smaller than the difference between shaft forces of said pulleys that is determined by the current input torque and the pulley ratio of the CVT pulleys when the output torque is transmitted from the primary pulley to the secondary pulley (positive torque state). The difference between the shaft forces of the primary and secondary pulleys is made smaller without becoming negative. The difference between the shaft forces of the primary and the secondary pulleys can also be made smaller than the difference between shaft forces of the primary and the secondary pulleys that is determined by the current input torque and the pulley ratio of the CVT pulleys when the output torque is transmitted from the secondary pulley back through the primary pulley (negative torque state). The difference is made smaller without becoming negative.

As a result, a negative torque state during coasting changes the speed of the CVT in the U/D (deceleration) direction. When the number of engine rotations becomes smaller than the number of idle revolutions, a positive torque state occurs, causing the CVT to repeatedly change speed in the O/D (acceleration) direction according to the vehicle speed, to automatically converge to the gear neutral point (GN) and to be stabilized, at the neutral point, in the vehicle stop state.

However, though the CVT may be stabilized and maintained at the GN point by making both shaft forces substantially equal to each other (namely, within the above-mentioned range) based on the difference between the shaft forces of the primary pulley and the secondary pulley under the above-mentioned positive torque state and the above-mentioned negative torque state, automatic convergence of the CVT during the above-mentioned N control time is relatively slow and depends on switching between the above-mentioned negative torque and the positive torque. The convergence may not be fast enough for the actual vehicle stop speed, or the degree of deceleration to stop the vehicle by applying a brake, for example.

It may be possible to speed up the convergence of the CVT to the GN point by changing and controlling the primary and the secondary shaft force to the convergence to the GN point as in the case of normal transmission, but even with this method, the CVT may not always be able to comply depending upon the degree of deceleration of the vehicle. Furthermore, controlling the difference of shaft forces on both pulleys in an attempt to increase the down-shift speed of the CVT may result in the switching of the forward gear and the reverse gear beyond the GN point.

Hence, the present invention aims to provide an IVT in which the output torque from a torque source is input into the belt type continuously variable transmission apparatus (CVT) to speed up the convergence speed of the CVT to the neutral point (GN), while establishing the neutral state reliably during the stoppage of the vehicle.

According to a preferred embodiment of the invention, an infinitely variable transmission comprises an input shaft, which interlocks with an output shaft of a torque source, an output member, which interlocks with the wheels, a belt type continuously variable transmission apparatus having a primary pulley and a secondary pulley, with the primary pulley interlocking with the input shaft, a belt being wound on the pulleys and a shaft force operating means for controlling shaft force on the pulleys in order to change the pulley ratio of said primary pulley and secondary pulley by changing the distance between a movable sheave and a stationary sheave on each of the pulleys. A planetary gear is also included with at least first, second and third rotational elements and with the torque transmission direction between said pulleys being changed based on the change of the pulley ratio of said continuously variable transmission apparatus as well as the control of said first rotational element being interlocked with said input shaft, said second rotational element being interlocked with said secondary pulley and said third rotational element being interlocked with said output member so that the output torque direction of said output member is changed. The invention further includes a determination means for determining, based on the signals from a detection means for detecting the wheel running state, whether the neutral state is needed with the output member not rotating. A neutral control means controls said shaft force operating means so that the difference between shaft forces operating on said primary pulley and said secondary pulley is within a predetermined range when said determination means determines that a neutral state is needed, and an input torque control means controls said torque source so that a predetermined torque is input into said input shaft during operation of said neutral control means.

Another aspect of the invention includes said neutral control means controlling said shaft force operating means so that power transmission by means of the belt between said pulleys is maintained and the shaft force is generated to make the pulley ratio of said pulleys converge to said neutral state by means of an excess or shortage of shaft force on one pulley caused by said power transmission.

A further aspect of the invention includes said shaft force operating means comprising hydraulic actuators having hydraulic chambers, to which oil pressure is supplied, for each of said pulleys, and the hydraulic chambers of both hydraulic actuators contain substantially equal effective pressure receiving areas.

Alternatively, the invention includes said shaft force operating means comprising a hydraulic actuator having hydraulic chambers, to which oil pressure is supplied, for each of said pulleys, and the hydraulic chambers of both hydraulic actuators contain a mutually different effective pressure receiving area.

The invention can include said neutral control means applying a substantially equal oil pressure to hydraulic chambers of both of the hydraulic actuators.

Alternatively, the invention can include the neutral control means applying slightly different oil pressures to the hydraulic chambers of both of the hydraulic actuators.

Another aspect of the invention includes the input torque means controlling said torque source so that said predetermined torque is always in a normal torque state with the torque being transmitted from the torque source to the wheels, and a difference between the shaft forces operating on the primary and secondary pulleys converges to a state in which said output member rotation becomes 0 with the difference between shaft forces not becoming negative.

The invention includes the determination means determining that the pulley ratio of said belt type continuously variable transmission apparatus is within a predetermined range and that said neutral state is needed when the throttle pedal is not depressed and the brake pedal is depressed.

The invention also includes said torque source being an engine and said input torque control means controlling the degree of throttle opening of said engine so that a predetermined torque is output.

Based on the above described structure, engine output from the input shaft is transmitted to the second rotational element of the planetary gear system after being appropriately accelerated or decelerated through the belt type continuously variable transmission apparatus and the constant rotation is transmitted to the first rotational element. Both of these rotations are combined in the planetary gear system and transmitted from the third rotational element to driving wheels of the vehicle through the output member. In this case, torque circulation is generated and the direction of rotation of the output member switches from normal to reverse rotation with the pulley ratio of the belt type continuously variable transmission apparatus approaching the neutral position (GN) where the rotation of the output member becomes 0.

If the pulley ratio, which is computed from signals from the input shaft rotation sensor and the secondary shaft rotation sensor based on the signals from the selection means, is within a predetermined range, and if the determination means determines that the neutral state is needed based on the signals indicating that the throttle pedal is not depressed while the brake pedal is depressed, the neutral control means begins operation and the shaft force operation means is controlled so that the difference between shaft forces of the primary and the secondary pulleys falls within a predetermined range.

Double chamber type hydraulic actuators can be controlled to supply predetermined oil pressure into the first hydraulic chambers and to release oil pressure from the second hydraulic chambers. Single chamber type hydraulic actuators can be controlled to supply low pressure from a low regulator valve into both hydraulic chambers or both hydraulic chambers can be controlled to result in a predetermined oil pressure difference. As a result, the torque transmission between both pulleys by the belt is maintained, and the shaft forces which enable a change in pulley ratio of the pulleys are applied to both pulleys by the shaft forces associated with said torque transmission.

The input torque control means begins operation and controls the degree of the throttle opening, for example, so that a predetermined torque is transmitted from the engine output shaft to the input shaft. As a result, due to an increase in the input torque of the belt type continuously variable transmission apparatus (CVT) caused by an increase in the output torque of the torque source, the self-convergence of said CVT to the gear neutral (GN) point progresses at high speed. Moreover, the CVT, in compliance with the deceleration of the vehicle, converges to the GN point, and when the CVT (11) reaches the GN point, the vehicle comes to a stop.

With an embodiment of the invention, predetermined torque is input from the torque source to the belt type continuously variable transmission apparatus during neutral control operation to make the difference in shaft forces applied to the primary and the secondary pulleys come within a predetermined range. The speed of convergence of the CVT to the GN point becomes faster due to the input torque, and the CVT converges to the GN point in compliance with the deceleration of the vehicle as the vehicle changes from the running state to the still state, which causes the vehicle to come to a complete stop.

Another aspect of the invention includes predetermined low shaft forces being applied to both pulleys to secure torque transmission by the CVT, the pulley ratio being changed according to the excess or shortage of the shaft force of one pulley due to torque transmission. The CVT automatically converges and stabilizes towards the GN point where work load as an infinitely variable transmission becomes minimum, and hence, neutral control is executed with a simple control operation.

In another aspect of the invention the above neutral control may be achieved even with a simple structure in which substantially the same hydraulic actuators are used for the primary pulley side and the secondary pulley side.

In another aspect of the invention a desired state may be established such as setting the starting creep torque to be 0, and the convergence to the desired creep torque state may be achieved through neutral control. In particular, by setting the difference of the effective pressure receiving area of the hydraulic chambers so that the pulley ratio of the GN point with no load state becomes the GN point, or equivalently, the creep torque becomes 0, the input torque may be made small by means of input torque control during the neutral control operation.

The invention may also include application of substantially equal oil pressure to both hydraulic chambers and oil pressure control during neutral control operation may be executed easily and reliably with a highly reliable structure.

Additionally, the invention may include neutral control which improves safety during starting by preventing creep torque in the reverse direction during the D range, and preventing creep torque in the forward direction during the R range, for example.

According to a further aspect of the invention, deviation of the CVT from the GN point may be prevented because, after achievement of the CVT convergence to the GN point, the direction of passing torque of the CVT reverses during the switching of an infinitely variable transmission between forward and reverse, which reversal causes the input torque of the CVT, with the above convergence force remaining positive, to act as a restriction force in the direction of deviation from the GN point.

The invention allows a determination of the state in which vehicle stoppage is needed to be made easily and reliably.

The engine output torque may also be freely established by an electronic throttle system, for example.

BRIEF DESCRIPTION OF THE DRAWINGS

FIG. 8 is a graph showing the relationship between the input torque and the convergence power at each pulley ratio.

DETAILED DESCRIPTION OF PREFERRED EMBODIMENTS

Figure 1:
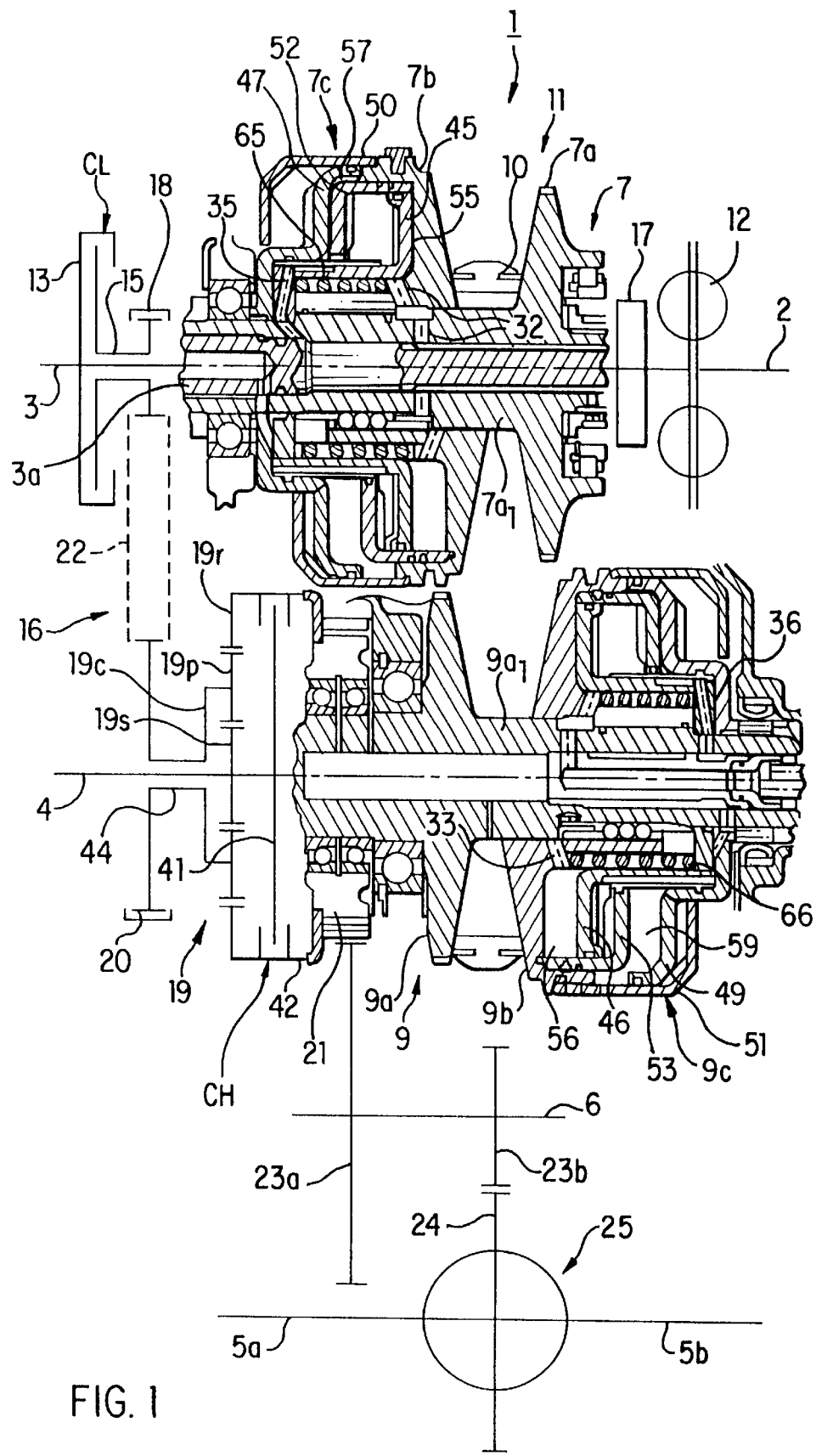
FIG. 1 is a front elevation view in partial cross section of an infinitely variable transmission according to the present invention.

An embodiment of the present invention is described hereafter with reference to the drawings. An automatic infinitely variable transmission 1 for use in a vehicle comprises a first shaft 3, which lines up with an engine crank shaft 2, a second shaft 4, a third shaft 5($a$, $b$) which lines up with the front wheel shaft and a fourth shaft 6 composed of a counter shaft. A primary pulley 7 is arranged on the first shaft 3 and a secondary pulley 9 is arranged on the second shaft 4, over both of which pulleys 7, 9 a belt 10 is wound to form a continuously variable transmission apparatus 11.

The first shaft 3 is directly connected to the engine crank shaft 2, through a damper apparatus 12, which absorbs the torque fluctuation of the engine, to form an input shaft. The input shaft 3 is includes a fixed sheave 7$a$ of the primary pulley 7 and a shaft 3$a$, which is spline-fitted in a boss unit 7$a_1$ of the fixed sheave 7$a$. An input side member 13 of a low clutch $C_L$ is anchored on the shaft 3$a$, which makes up the input shaft 3, and an output side member 15 of the low clutch $C_L$ is supported on the shaft 3$a$ in such a manner that the shaft 3$a$ rotates freely. A primary side sprocket 18, which composes a constant speed transmission apparatus 16, is connected to the output side member 15 to form a single unit. An oil pump 17 is connected to the fixed sheave 7$a$ of the primary pulley 7, which composes the input shaft 3, and a movable sheave 7b is supported by the fixed sheave 7a in such a manner that the movable sheave moves in the axial direction toward and away from fixed sheave 7a, driven by an hydraulic actuator 7c to be explained later.

The second shaft 4 is composed of a fixed sheave 9a of the secondary pulley 9, and a movable sheave 9b is supported by the fixed sheave 9a in such a manner that the movable sheave moves in the axial direction toward and away from fixed sheave 9b, driven by a hydraulic actuator 9c. A high clutch $C_H$ and a planetary gear 19 are arranged on the second shaft 4 and the secondary side sprocket 20 and an output gear (output member) 21 are supported to rotate freely.

The planetary gear 19 comprises a sun gear 19s, a ring gear 19r and a single pinion planetary gear system with a carrier 19c which supports a pinion gear 19p that engages the sun gear and the ring gear in such a manner that the pinion gear rotates freely. The sun gear 19s is connected to the fixed sheave 9a of the secondary pulley 9 that composes the second shaft 4 to form a second rotational element, the ring gear 19r is connected to the output gear 21 to form the third rotational element, and the carrier 19c is connected to the secondary side sprocket 20 to form the first rotational element. Flexible drives such as a silent chain, a roller chain and the like, or a synchronizing body 22 such as a timing belt are wound on the primary side and the secondary side sprockets 18, 20. The high clutch $C_H$ is provided between the sun gear 19s and the ring gear 19r.

The output gear (output member) 21 engages the large gear 23a of the counter shaft 6 that composes the fourth shaft, the small gear 23b of the counter shaft 6 engages the ring gear 24 of the differential apparatus 25, and the differential apparatus 25 outputs a differential rotation to each of the left and right axle shafts 5a, 5b that compose the third shaft.

The hydraulic actuators 7c, 9c in the primary pulley 7 and the secondary pulley 9 respectively comprise divider members 45, 46 and cylinder members 47, 49 that are respectively anchored on the fixed sheave boss unit $7a_1$, $9a_1$, and drum members 50, 51 and second piston members 52, 53 that are anchored in the back of the movable sheaves 7b, 9b. The divider members 45, 46 are fitted to the second piston members 52, 53 in such a manner that oil is sealed therebetween and the second piston members 52, 53 are fitted to the cylinder members 47, 49 and the divider members 45, 46 in such a manner that oil is sealed therebetween, forming a double piston (double chamber) structure composed respectively of the first hydraulic chambers 55, 56 and the second hydraulic chambers 57, 59.

In the first hydraulic chambers 55, 56 of the hydraulic actuators 7c, 9c, the back face of the respective movable sheaves 7b, 9b composes the piston face, and the effective pressure receiving area of the piston face is made to be the same for the primary side and the secondary side. Oil paths 32, 33 leading to the first hydraulic chambers 55, 56 and oil paths 35, 36 leading to the second hydraulic chambers 57, 59 are formed respectively in the primary side and the secondary side fixed sheave boss units $7a_1$, $9a_1$, and pre-load springs 65, 66 that energize movable sheaves in the primary side and the secondary side in the direction towards the fixed sheaves 7a, 9a respectively are provided in the compressed state.

Figures 2, 3:
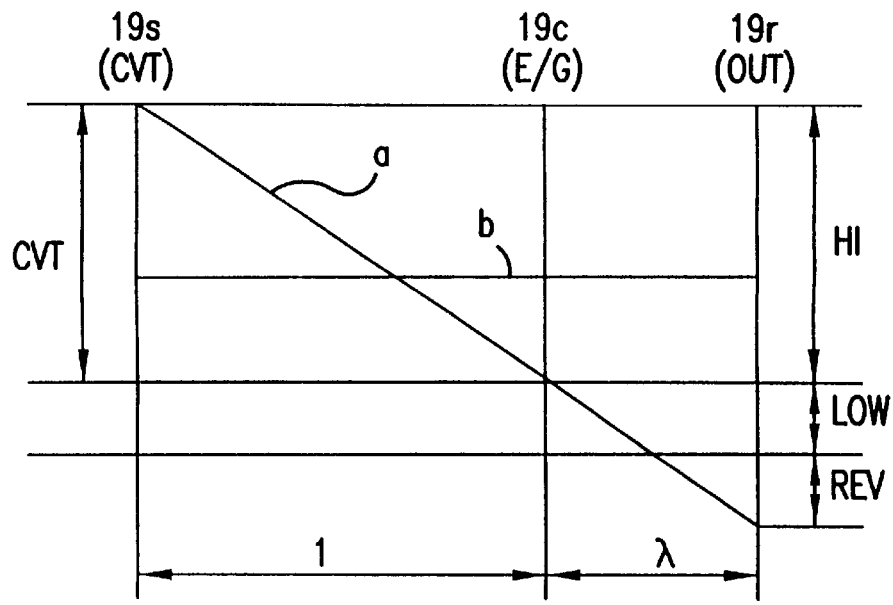
FIG. 2 is a graph showing the relationship between the speed of rotation of the CVT, the carrier and the ring gear in the infinitely variable transmission.
FIG. 3 is a table showing the engagement state of each clutch for different operating states.

The operation regarding the aforementioned infinitely variable transmission 1 is described hereafter, with reference to FIG. 1, FIG. 2 and FIG. 3. Rotation of the engine crank shaft 2 is transmitted to the input shaft 3 through the damper apparatus 12. In the low mode where the low clutch $C_L$ is connected and the high clutch $C_H$ is disconnected during the D range, the rotation of said input shaft 3 is transmitted to the primary pulley 7 and to the carrier 19c of the planetary gear 19 through the constant speed transmission apparatus 16 that is composed of the primary side sprocket 18, the synchronizing body 22 and the secondary sprocket 20. Meanwhile, the rotation of said primary pulley 7 is transmitted to the secondary pulley 9 after its speed is continuously changed through the necessary adjustment of the pulley ratio of the primary and the secondary pulleys by the hydraulic actuators 7c, 9c to be explained later, and the variable rotation of the pulley 9, in turn, is transmitted to the sun gear 19s of the planetary gear 19.

At the planetary gear system 19, the continuously variable rotation from the continuously variable transmission apparatus (CVT) 11 is transmitted to the sun gear 19s with the carrier 19c to which the constant speed rotation is transmitted through the constant speed transmission apparatus 16 acting as reaction force element (as shown in the speed graph of FIG. 2,) and the rotations of the carrier and the sun gear are combined and transmitted to the output gear 21 through the ring gear 19r. In this case the ring gear 19r that comprises a rotational element other than a reaction force support element is connected to the output gear 21, hence, the planetary gear 19 generates a torque circulation, and at the same time, the output shaft 5 rotates in the direction of normal rotation (Lo) and reverse rotation (Rev) across the zero rotation because the sun gear 19s and the carrier 19c rotate in the same direction. In other words, with the continuously variable transmission apparatus 11, torque is transmitted from the secondary pulley 9 to the primary pulley 7 during the rotation of the output shaft 5 in the normal direction (forward) while the torque is transmitted from the primary pulley 7 to the secondary pulley 9 during the rotation of the output shaft in the reverse (backward) direction based on the aforementioned torque circulation.

During a high mode in which the low clutch $C_L$ is disconnected and the high clutch $C_H$ is connected, the transmission to the planetary gear 19 through the constant speed transmission apparatus 16 is cut off, causing the planetary gear 19 to rotate as a single unit due to the engagement of the high clutch $C_H$. Hence, the rotation of the input shaft 3 is transmitted mainly to the output gear 21 through the continuously variable transmission apparatus (CVT) 11 and the high clutch $C_H$. In short, the CVT 11 transmits the torque towards secondary pulley 9 from the primary pulley 7. Moreover, the rotation of the output gear 21 is transmitted to the differential apparatus 25 through the gears 23a, 23b of the counter shaft gear 6, which, in turn, is transmitted to the left and right front wheels through the left and right axle shafts 5a, 5b.

Figure 4:
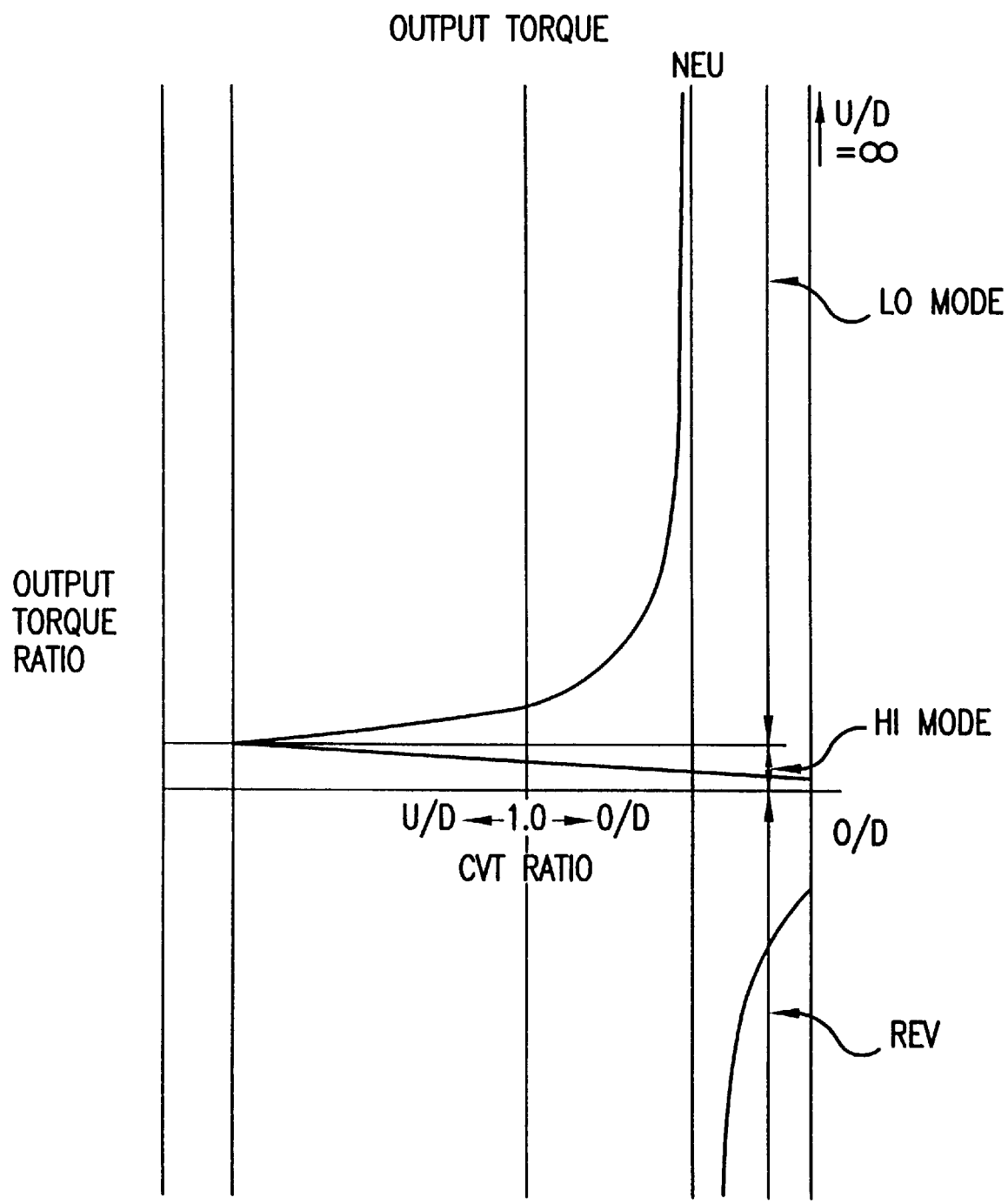
FIG. 4 is a graph showing changes in output torque associated with the torque ratio of the belt type continuously variable transmission (CVT).
Figure 5:
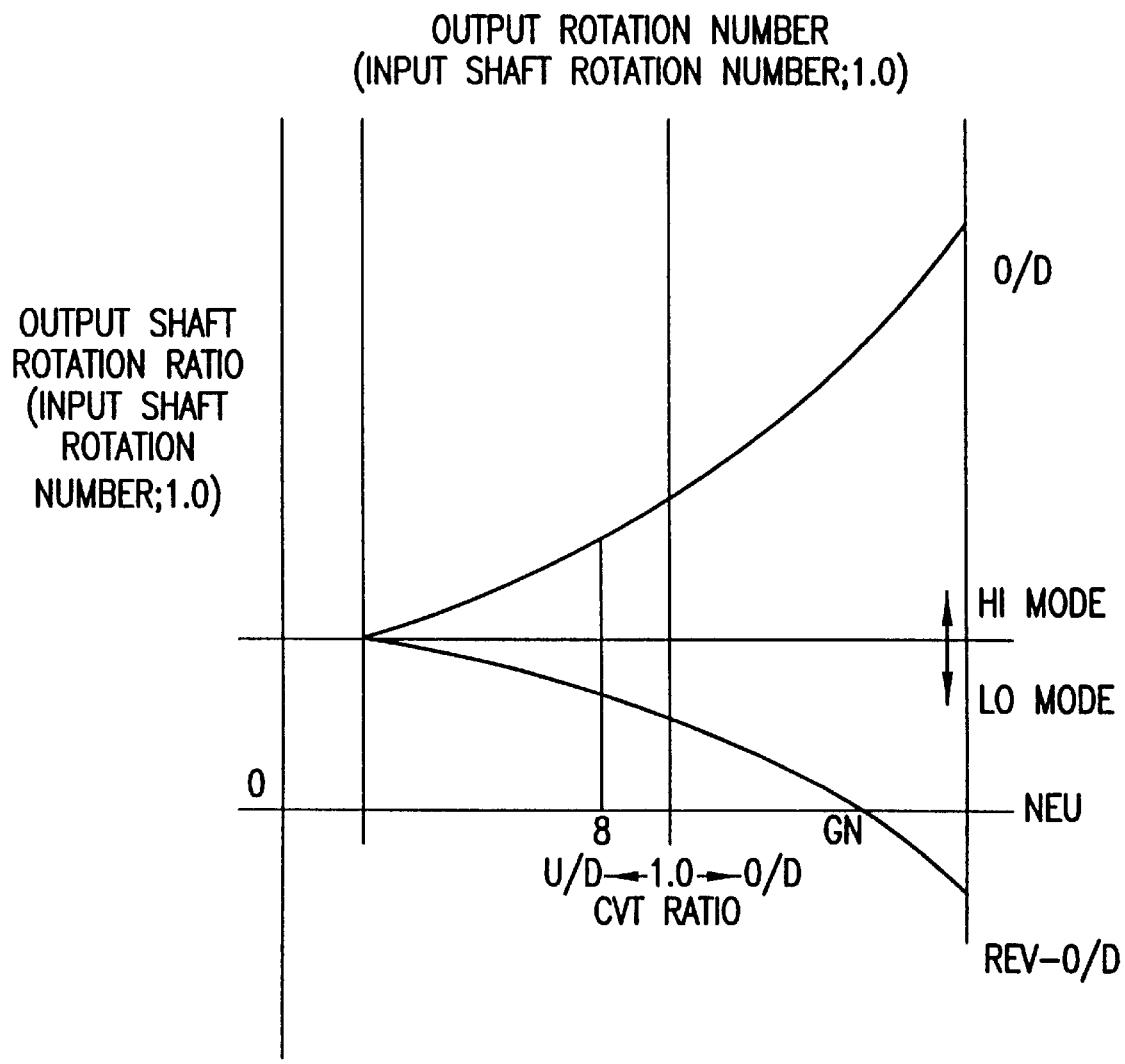
FIG. 5 is a graph showing changes in output rotation number relating to the torque ratio of the CVT.

Using the fact that the rotation of the sun gear 19s reaches the maximum when the belt type continuously variable transmission apparatus (hereafter CVT) 11 is at the limit in a positive acceleration direction (O/D edge) during the low mode as described in the speed graph of FIG. 2, the output torque chart of FIG. 4 and the output rotation number chart of FIG. 5, the ring gear 19r is made to reverse relative to the rotation of the carrier 19c with constant rotation, and the reverse rotation (Rev) is transmitted to the output gear 21. Moreover, the rotation number of the reverse rotation decreases with changing of speed of the CVT 11 in the deceleration direction (U/D), and the neutral position (NEU) in which the rotation number of the output gear 21 becomes 0 is achieved with a predetermined pulley ratio that is determined by the gear ratio of the planetary gear 19 and the constant speed transmission apparatus 16. The ring gear 19r is switched to rotate in the positive direction with the changing of speed of the CVT 11 in the deceleration direction (U/D), and the rotation in the positive direction, namely forward direction, is transmitted to the output gear 21. In this case, the torque of the output gear diverges infinitely in the vicinity of the neutral position (NEU) described above, which is obvious from FIG. 4.

Next, when CVT 11 reaches the limit in the deceleration direction (U/D), the high clutch $C_H$ is connected and a high mode is enabled. In the high mode, the output rotation of the CVT 11 is directly transmitted to the output gear 21, and hence the speed graph 2 becomes horizontal as shown with line b in FIG. 2. The rotation of the output gear 21 is changed in the direction of acceleration with the change of speed of the CVT 11 in the direction of acceleration (O/D), and consequently, the transmission torque is reduced accordingly. Here the symbol λ in FIG. 2 denotes the ratio (Zs/Zr) between the number of teeth on the sun gear Zs and the number of teeth on the ring gear (Zr).

In this instance, during the parking range P and the neutral range N described in FIG. 3, the low clutch $C_L$ and the high clutch $C_H$ are both disconnected, and the torque from the engine is cut off. In this case, the differential apparatus 25 is locked during the parking range P, causing the wheel shafts 5a, 5b to be locked.

Figure 6:
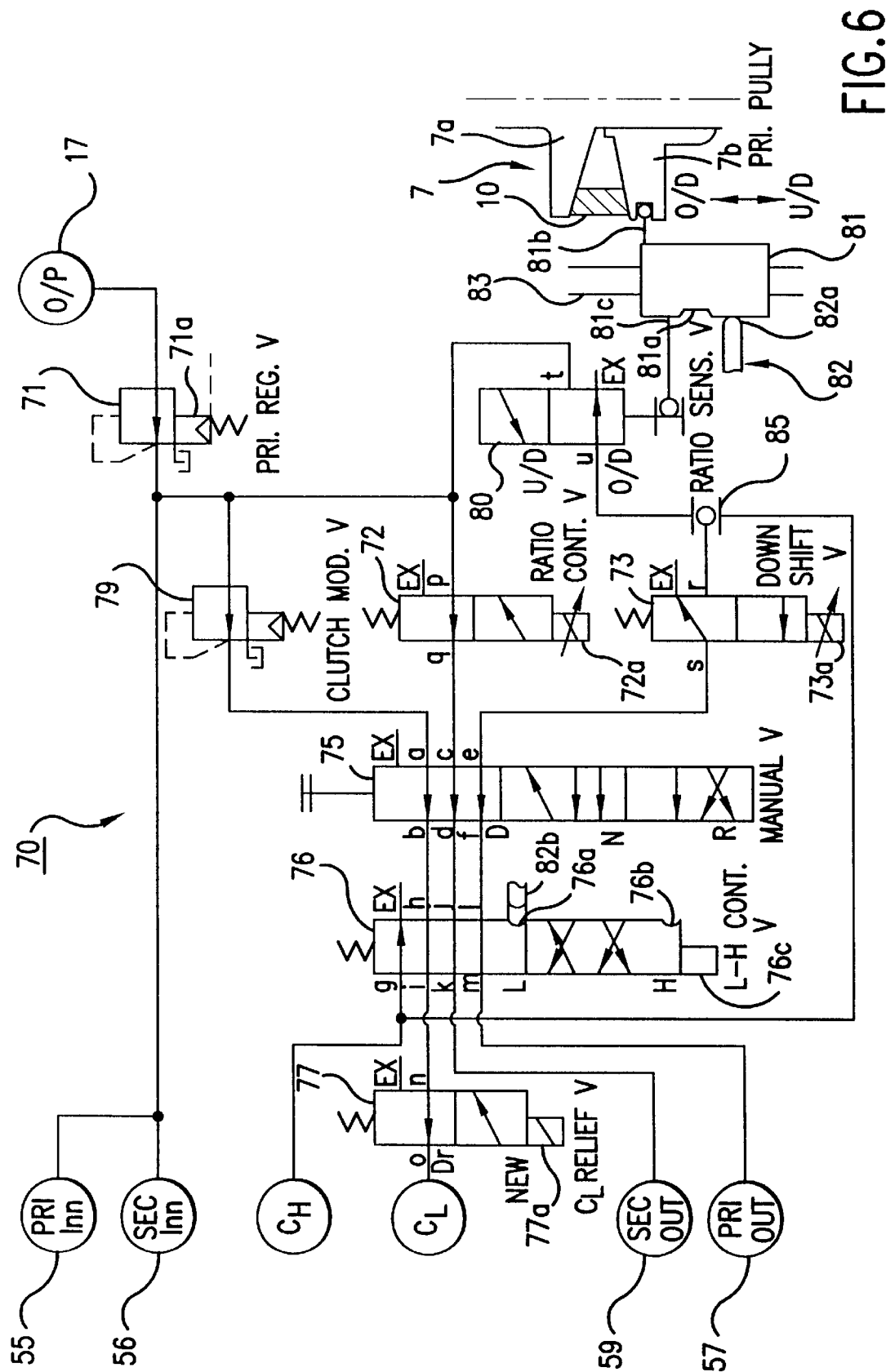
FIG. 6 is a schematic diagram showing a hydraulic control mechanism that may be applied to the infinitely variable transmission of the present invention.

The hydraulic control mechanism according to a configuration of the present invention is described hereafter, with reference to FIG. 6. The hydraulic control mechanism 70 comprises a primary regulator valve 71, a ratio control valve 72, a downshift relief valve 73, a manual valve 75, a low-high control valve 76, a low clutch relief valve 77, and a clutch modulation valve 79, and further comprises a ratio sensing valve 80 as a regulation means, a sensor shoe 81 as a pulley ratio detection means and an interlock rod 82 as a locking means.

A sensor shoe 81 slides freely while being supported by the guide member 83 that is arranged parallel to the axis of the primary pulley 7. Two connecting units 81a, 81b protrude from the sensor shoe 81 with the connecting unit 81a being engaged with the movable sheave 7b of the primary pulley 7 and the other connecting unit 81b being engaged with aforementioned ratio sensing valve 80. Hence, when the movable sheave 7b moves along the axis in the O/D direction or in the U/D direction, the amount of movement is transmitted directly to the ratio sensing valve 80 through the sensor shoe 81.

An indentation 81a is formed in the sensor shoe 81 and a base edge 82a of the interlock rod 82 is engaged or removed in the indentation 81a. The interlock rod 82 is arranged in such a manner that the interlock rod 82 pierces through the valve body with the front edge 82b being engaged or removed from the indentations 76a, 76b of the low-high control valve 76. In FIG. 6, the base edge 82a and the front edge 82b of the interlock rod 82 are described as being separate but in actuality these are formed as one body. When the base edge 82a engages the indentation 81a of the sensor shoe 81, the front edge 82b does not engage any of indentations 76a, 76b of the low-high control valve 76 but merely abuts the surface of the low-high control valve 76. On the other hand, when the base edge 82a is removed from the indentation 81a of the sensor shoe 81 and abuts the surface of the sensor shoe 81, the front edge 82b is made to engage one of the indentations 76a, 76b in the low-high control valve 76.

The hydraulic control mechanism 70 described above, supplies oil pressure to both first hydraulic chambers 55, 56 on the primary side and the secondary side during the neutral state while releasing the oil pressure of both of the second hydraulic chambers 59, 57, changes speed of the CVT 11 in the U/D direction by supplying oil pressure to the second hydraulic chamber 59 on the secondary side at the time of starting in the forward direction from the neutral state, and changes speed of the CVT in the O/D direction by supplying oil pressure to the second hydraulic chamber 57 on the primary side at the time of starting in the backward direction. In this case, in order to surely prevent starting in the backward direction during the D range due to switching of the low-high control valve caused by errors in computer operation, for example, a down shift is prohibited by the ratio sensing valve 80 in the predetermined forward moving range of the CVT, and the switching of the low-high control valve 76 is mechanically regulated by the aforementioned interlock rod 82. More specifically, the range is divided into a region (U/D side) in which the pulley ratio is larger than the predetermined pulley ratio B (1.3, for example) that is slightly larger than 1.0 in the forward moving range shown in FIG. 5 and a region (O/D side) in which the pulley ratio is smaller than the predetermined pulley ration B as shown in FIG. 5, and the control operation is changed in the respective ranges. With the change of control operation mentioned above, downshift during the D range mode and the R range mode as well as a jump from the D range H mode to the D range L mode and to the R range are prohibited in the region in which the ratio is less than or equal to the predetermined ratio B.

The operation of the hydraulic control mechanism 70 mentioned above is described hereafter with reference to FIG. 6. An explanation is given below in the following order of (1) the D range low mode, (2) the D range high mode, (3) the R (reverse) range, (4) N (neutral), and P (the parking) range. First of all, in all the modes (1)–(4), oil pressure from the oil pump 17 is adjusted appropriately by the primary regulator valve 71, is output from the output port v, is sent to the first hydraulic chambers 55, 56 of both hydraulic servos 7c, 9c in the primary and the secondary sides to make both chambers equal in pressure, and is further sent to the clutch modulation valve 79. The output oil pressure from the clutch modulation valve 79 is selectively supplied to the low clutch $C_L$ or the high clutch $C_H$, except for the case of the N, P range of (4).

(1) D Range Low Mode

Equal oil pressure is provided to the first hydraulic chambers 55, 56, low clutch $C_L$ is connected, oil pressure is supplied to the second hydraulic chamber 59 on the secondary side during up-upshift, and oil pressure is supplied to the second hydraulic chamber 57 on the primary side only if the aforementioned pulley ratio is larger than or equal to B during down-shift. In other words, during up-shift, the manual valve 75 is set to the D range position, the ports a and b, c and d, and e and f are joined, the low-high control valve 76 is set in the low mode position, the ports h and i, j and k, and l and m are joined, and the port g is switched and maintained to join the drain port Ex.

Hence, in the low clutch $C_L$, oil pressure from the clutch modulation valve 79 is supplied to the low clutch hydraulic servo through the ports a and b of the manual valve 75, the ports h and i of the low-high control valve 76, and the ports n and o of the low clutch relief valve 77, and the low clutch $C_L$ is engaged. Oil pressure from the output port v of the primary regulator valve 71 is gradually increased by the ratio control valve 72 until oil pressure reaches the value corresponding to the target pulley ratio, after which the resulting oil pressure is supplied to the second hydraulic chamber 59 on the secondary side through the ports p and q, the ports c and d of the manual valve 75, and the ports j and k of the low-high control valve 76. In this state, the high clutch $C_H$ is in the disconnected state, being joined with the drain port Ex from the port g of the low-high control valve 76, and the second hydraulic chamber 57 is joined with the drain port Ex through the ports m and l of the low-high control valve 76, the ports f and e of the manual valve 75, and the port s of the down-shift relief valve 73. In this instance, the switching of the low-high control valve 76 is mechanically regulated by the aforementioned interlock rod 82 if the CVT 11 is in the range less than said predetermined pulley ratio B as a result of said up-shift.

In this manner, the low clutch $C_L$ is connected and in the CVT 11 the shaft force by the secondary side hydraulic servo 9c that acts on both the first and the second hydraulic chambers 56, 59 becomes larger than the shaft force by the primary side hydraulic servo 7c that acts only on the first hydraulic chamber 55, and the shaft force is gradually increased, causing an increase in pulley ratio. At this time, the movable sheave 7b of the primary pulley 7 moves to the U/D side. In this state, engine torque which is transmitted from the input shaft 3 to the carrier 19c of the planetary gear 19 through the low-clutch $C_L$ and the constant speed transmission apparatus 16 is obtained from the output gear 21 through the ring gear 19r while being regulated at the CVT 11 through the sun gear 19s with the predetermined pulley ratio.

As for down-shift during the D range low mode, the ratio sensing valve 80 is in a state shown in FIG. 6 through the sensor shoe 81 in the region where the pulley ratio is less than aforementioned predetermined pulley ratio B, and oil pressure from the output port v of the primary regulator valve 71 is stopped by the ratio sensing valve 80, and as a result, the supply of oil pressure to the second hydraulic chamber 57 on the primary side which is needed for down-shift is stopped. Here, even in this case, oil pressure of the second hydraulic chamber 59 on the secondary side may be drained by joining the port q of the ratio control valve 72 with the drain port Ex, making it possible to down-shift until the neutral state. On the other hand, in the region where the pulley ratio is larger than or equal to the aforementioned predetermined value B, down-shift is enabled by the ratio sensing valve 80 and the like. In other words, when the pulley ratio is larger than or equal to the predetermined pulley ratio B, the movable sheave 7b of the primary pulley 7 moves to the U/D side and the ratio valve 80 moves toward the bottom of the figure with the sensor shoe 81. Hence, oil pressure from the primary regulator valve 71 is led to the down-shift relief valve 73 through the check valve 85 as a result of joining the ports t and u of the ratio sensing valve 80. Hence, by moving the down-shift relief valve 73 upward in the figure and joining the ports r and s, the supply of oil pressure for the second hydraulic chamber 57 in the primary side through the ports e and f of the manual valve 75, and the ports l and m of the low-high control valve 76 is enabled.

(2) D Range High Mode

Equal oil pressure is provided to both first hydraulic chambers 55, 56 of the primary and the secondary side, the high clutch $C_H$ is connected, and oil pressure is supplied to the second hydraulic chamber 57 on the secondary side during up-shift, and oil pressure is supplied to the second hydraulic chamber 59 on the primary side. In other words, during up-shift in the D range high mode, the manual valve 75 is set to the D range position, as in the case of the low mode, but the low-high control valve 76 is switched to the high mode position, ports h and g, j and m, and l and k are respectively joined, and the port i is joined with the drain port Ex.

Hence, the output oil pressure from the output port v of the primary regulator valve 71 is supplied to the high clutch hydraulic servo through the ports a and b of the manual valve and the ports h and g of the low-high control valve 76, engages said clutch $C_H$, and is supplied to the second hydraulic chamber 57 on the primary side through the ports p and q of the ratio control valve 72, the ports c and d of the manual valve 75, and the ports j and m of the low-high control valve 76. In this state, the low clutch hydraulic servo $C_L$ is in the disconnect state being joined with the drain port Ex from the port i of the low-high control valve 76, while the second hydraulic chamber 59 on the secondary side is joined with the drain port Ex through the ports k and l of the low-high control valve 76, the ports f and e of the manual valve 75, and the port s of the down-shift relief valve 73.

In this manner, the high clutch $C_H$ is connected, and in CVT 11, the shaft force by the primary side hydraulic servo 7c where oil pressure is supplied to the first and the second hydraulic chambers 55, 57 becomes larger than the shaft force of the secondary side hydraulic servo 9c where oil pressure is supplied only to the first hydraulic chamber 56, and the appropriate pulley ratio (torque ratio) is obtained by appropriately adjusting the manual valve 75 under a shaft force state corresponding to torque transmission from the primary pulley 7 to the secondary pulley 9 to adjust the oil pressure of the second hydraulic chamber 57 in the primary hydraulic servo 7c, which, in turn, adjusts the shaft force of the primary pulley 7. In this state, the torque transmitted from the engine to the input shaft 3 is appropriately changed by the CVT 11 which is transmitted from the primary pulley 7 to the secondary pulley 9 and is obtained from the output gear 21 through the high clutch $C_H$.

In the D range high mode described above, switching of the low-high control valve 76 to the low mode is mechanically prohibited by the interlock rod 82 when the CVT 11 is in a region where the pulley ratio is smaller than the predetermined value B (O/D side). Contrary to the case of the aforementioned D range low mode, down-shifting is never prohibited even when the pulley ratio of the CVT is less than or equal to the predetermined value B. In other words, oil pressure from the output port v of the primary regulator valve is stopped by the ratio sensing valve 80 which is in the state shown in FIG. 6, hence, the oil pressure is never supplied to the second hydraulic chamber 49 on the secondary side through the down-shift relief valve 73, the manual valve 75 and the low-high control valve 76 even during the D range high mode. Instead, oil pressure from the high clutch $C_H$ is supplied to the second hydraulic chamber 59 on the secondary side through the check valve 85, the ports r and s of the down-shift relief valve 73, the ports e and f of the manual valve 75, and the ports l and k of the low-high control valve 76. In this manner, down-shifting is enabled over the entire range of the pulley ratio during the D range high mode.

(3) R Range

In the R range, a predetermined oil pressure is supplied to the first and the second hydraulic chambers 55, 57 of the primary side hydraulic servo 7c, to the first hydraulic chamber 56 of the secondary side hydraulic servo 9c and to the low-clutch hydraulic servo $C_L$. In other words, during said R range, the manual valve 75 is set in the R range position and the low-high control valve 76 is set in the low mode position. Hence, oil pressure from the output port v of the primary regulator valve 71 is supplied to the low clutch hydraulic servo $C_L$ through the ports a and b of the manual valve 75, and the ports h and i of the low-high control valve 76 as well as to the second hydraulic chamber 57 through ports p and q of the ratio control valve 72, the ports c and f of the manual valve 75, and the ports l and m of the low-high control valve 76. The port s of the down-shift relief valve 73 is joined with the drain port Ex.

As a result, the low clutch $C_L$ is connected, and in the CVT 11, the shaft force by the primary side hydraulic servo 7c where the oil pressure is supplied to the first and the second hydraulic chambers 55, 57 becomes larger than the shaft force of the secondary side hydraulic servo 9c where oil pressure is supplied only to the first hydraulic chamber 56, resulting in the shaft force state corresponding to the torque transmission from the primary pulley 7 to the secondary pulley 9, and the appropriate pulley ratio is obtained by appropriately adjusting the ratio control valve 72 to adjust the oil pressure of the second hydraulic chamber 57 in the primary hydraulic servo 7c. In this state, the pulley ratio for the CVT 11 is in a predetermined acceleration (O/D) state, the engine torque from the input shaft 3 is transmitted to the carrier 19c of the planetary gear 19 through the low clutch $C_L$ and the constant transmission apparatus 16, and also is transmitted to the sun gear 19s through the CVT 11 which is torque transmitted from the primary pulley 7 to the secondary pulley 9, both of which torques are combined at the planetary gear 19, and is obtained by the output shaft 5 as reverse rotation through the ring gear 19r. In this instance, as in the case when the pulley ratio of D range low mode is less than or equal to the predetermined value B, the supply of oil pressure to the down-shift relief valve 73 is prohibited by the sensor shoe 81 and the ratio sensing valve 80, hence down-shifting is prohibited, but because an engine brake is not particularly needed in the R range to begin with, no inconvenience is caused even when down-shifting is prohibited.

(4) N, P Range

When the manual valve 75 is set in the P range position and the N range position, both the low clutch $C_L$ and the high clutch $C_H$ are released and the predetermined oil pressure is supplied to the first hydraulic chambers 55, 56 of both hydraulic servos 7c, 9c in the primary side and the secondary side. In other words, in the manual valve 75 ports c and d, and e and f are joined respectively, and the port b is joined with the drain port Ex. Moreover, the low-high control valve 76 is maintained at the low mode position described above. The port q of the ratio control valve 72 is joined with the drain port Ex and the ratio sensing valve 80 is maintained at the position shown in FIG. 6. Hence, equal oil pressure is applied only to both hydraulic chambers 55, 56 of the primary hydraulic servo 7c and the secondary hydraulic servo 9c, resulting in nearly the same shaft force being applied to both the primary and the secondary pulleys 7, 9.

The control operation of an infinitely variable transmission according to the present embodiment is described next.

Figure 7:
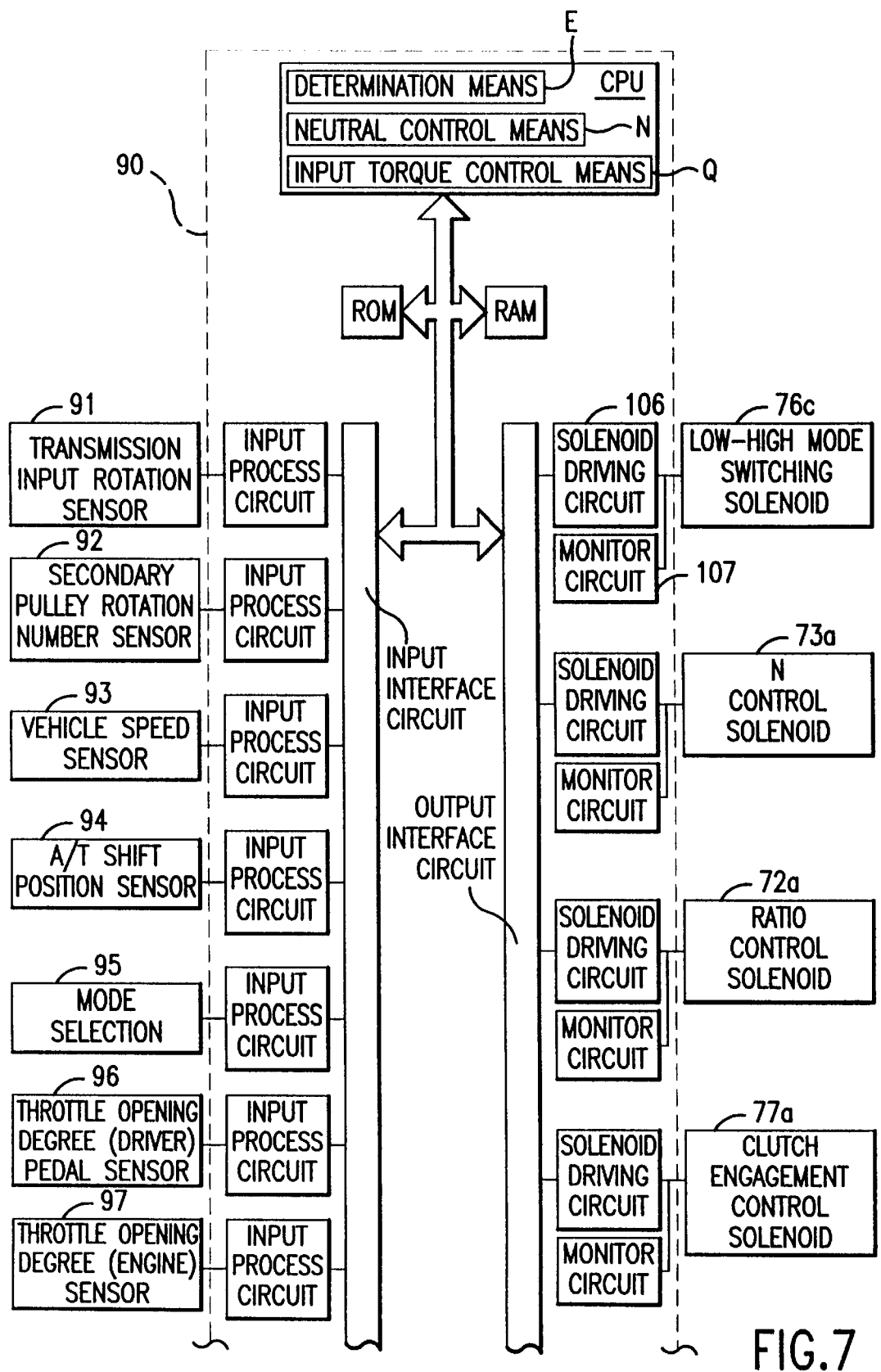
FIG. 7 is a block diagram showing the electric control mechanism of the infinitely variable transmission.
Figure 7A:
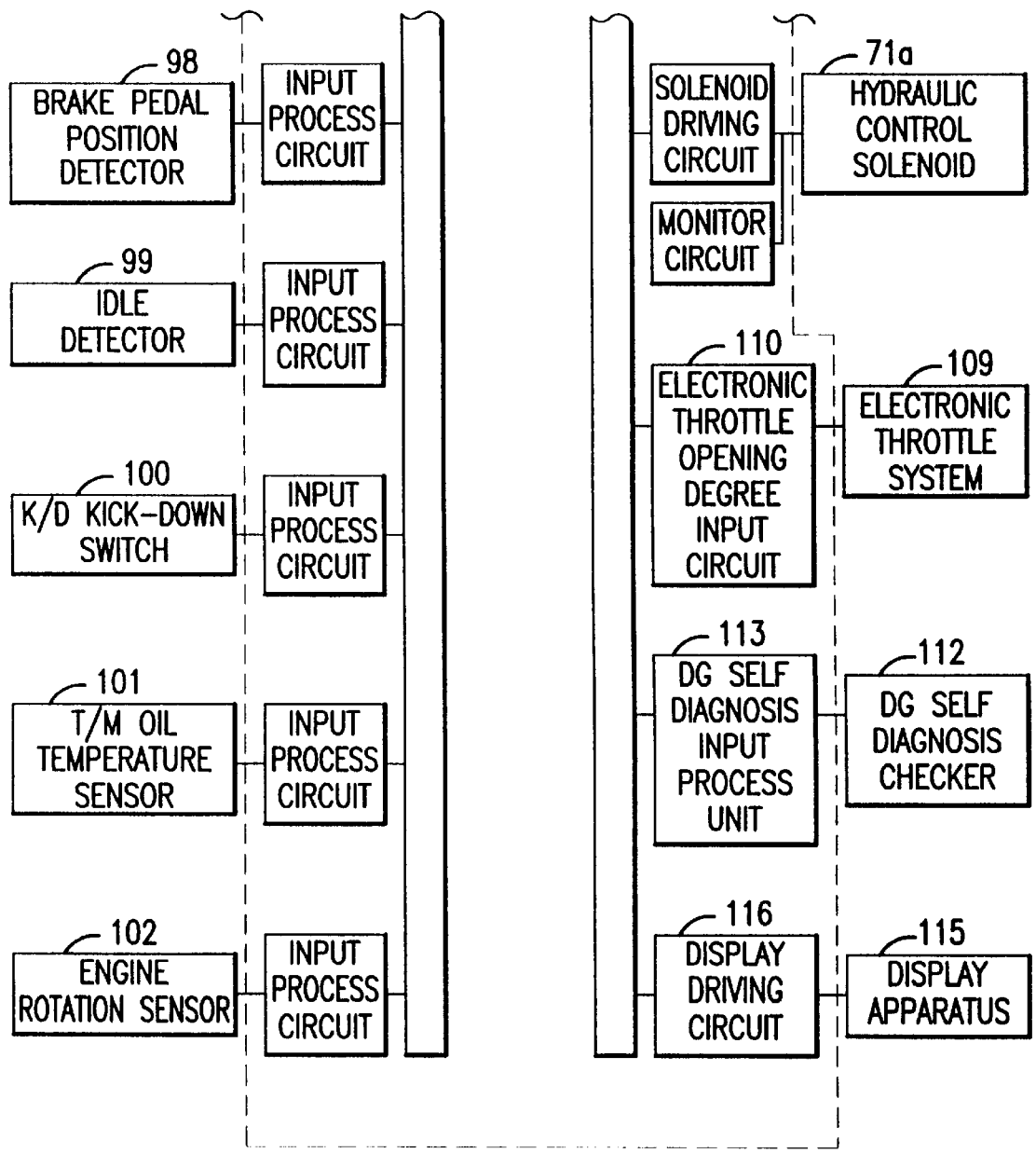

FIG. 7 is a block diagram of an electronic control unit (ECU) where 91 denotes a sensor for detecting the number of rotations of the input shaft 2 of the transmission, 92 denotes a sensor for detecting the rotation of the secondary pulley 9 of the CVT 11, 93 is a vehicle speed sensor for detecting rotation of the output shaft of the infinitely variable transmission, 94 denotes a sensor for recognizing the position in each shift position P,R, N, D where the shift lever, namely the manual valve of the infinitely variable transmission is set, 95 denotes a mode selection switch for selecting a power mode based on the maximum torque characteristics or an economy mode based on the best fuel efficiency, 96 denotes a sensor for detecting degree of opening of the throttle based on the depression of the throttle pedal, 97 is a sensor made of a potentiometer which is installed in the engine for detecting the actual degree of opening of the throttle, 98 denotes a switch for detecting the brake pedal depressed position, 99 denotes a sensor for detecting the foot off state of the throttle pedal with the throttle being in the idle state, 100 denotes a kick down switch for recognizing the throttle pedal being pushed to the floor, 101 denotes an oil temperature sensor of the transmission, and 102 denotes a sensor for detecting the number of engine rotations.

The signals from each of the sensors mentioned above are taken into the CPU, ROM or RAM through the respective input process circuit and the interface circuit. The control unit which is composed of said CPU comprises a determination means (E) for determining, based on the signals from each sensor which detects said vehicle running state, if the neutral state where the number of rotation of said output shaft 5 becomes 0 is needed, a neutral control means N for controlling both hydraulic actuators (shaft force operation means) so that the shaft force difference being applied to said primary and secondary pulleys 7, 9 falls within a predetermined range when said determination means determines that the neutral state is needed, and an input torque control means Q for controlling the torque source such as said engine so that a predetermined torque is input into said input shaft. The neutral control means N mentioned above controls both the hydraulic actuator to maintain torque transmission by the belt 10 and to apply a relatively weak predetermined shaft force, which may enable the shaft force generated by the belt 10 in conjunction with said torque transmission to change the pulley ratio, to both pulleys.

On the other hand, on the output side, 76c denotes a solenoid with on/off operation for the low-high control valve 76 which switches between the low mode and the high mode. The symbol 73a denotes a solenoid, made of a duty or a linear solenoid, for the down-shift relief valve 73 which drains the high pressure side circuit, and is operated during engine brake time or during neutral (N) control time, which will be explained later. The symbol 72a denotes a solenoid, made of a duty or a linear solenoid, for the ratio control valve 72 which adjusts the oil pressure for transmission control. The symbol 77a denotes a solenoid valve, made of a duty solenoid, for the low clutch relief valve 77. The symbol 71a is a solenoid, made of a linear solenoid, for the primary regulator valve 71 which controls the line pressure. Moreover, each solenoid is driven through the solenoid driving circuit 106 which generates predetermined voltage or output based on respective signals from the output interface circuit, and the operation of each solenoid is checked by the monitor circuit 107 to determine failure and for self diagnosis.

The symbol 109 denotes an electronic throttle system unit for engine control, and the symbol 110 denotes a process circuit which outputs a driving signal for an electronic throttle stepping motor and inputs feedback information. The symbol 112 denotes a checker member, made of an indicator lamp and the like, which outputs the result of self diagnosis during the failure of the electronic control unit 90, and the symbol 113 denotes the circuit which outputs the results of self diagnosis during the aforementioned failure time. The symbol 115 denotes a display apparatus which displays the status of the infinitely variable transmission such as a power mode and economy mode display lamps, and the symbol 116 denotes a driving circuit for the display apparatus.

The present infinitely variable transmission 1 directly transmits power to the input shaft 3 from the output shaft 2 through the damper device unit 12, eliminating the need for a conventionally required starter apparatus such as a torque converter, a fluid joint, an electromagnetic powder clutch or an input clutch. Hence, (neutral) N control becomes necessary in which the infinitely variable transmission 1 automatically becomes neutral during the still state of the vehicle in the D and R range.

N control is operated by said neutral control means N which operates based on the determination of said determination means that the neutral state is needed, and controls the shaft force of the primary pulley 7 and the secondary pulley 9 to fall within a predetermined range. For example, it controls the forces exerted on the shafts of the primary pulley 7 and the secondary pulley 9 by controlling the oil pressure in hydraulic chambers 55, 56, 57 and 59. The hydraulic pressures are controlled in such a manner that the difference between the shaft forces of the primary and the secondary pulleys is made smaller than the difference between the shaft forces on both pulleys that is determined by the current input torque and the ratio of the pulleys of the CVT when the torque is transmitted from the primary pulley to the secondary pulley. The difference between the shaft forces of the primary and secondary pulleys is made smaller without becoming negative. The hydraulic forces can also be controlled such that the difference between the shaft forces of the primary and the secondary pulleys is made smaller than the difference between shaft forces of the primary and the secondary pulleys that is determined by the current input torque and the ratio of the pulleys of the CVT when the output torque is transmitted from the secondary pulley to the primary pulley. Again, the difference between the shaft forces is made smaller without becoming negative. To be more specific, the shaft forces of both pulleys 7, 9 are conveyed by releasing the oil pressure of both second hydraulic chambers 57, 59 while the oil pressure in both first hydraulic chambers 55, 56 of the primary and secondary hydraulic actuators 7c, 9c is maintained.

During the N control, the engine is controlled concurrently with the input torque control means, and the predetermined input torque is applied to the CVT 11. Principles associated with convergence of the output torque ratio during N control based on said engine control are described below. Equation 1 below is known as Ogasawara's formula which describes the shaft force generated on a driving side pulley for a continuously variable V-belt-type transmission:

$$F_{DV}=(\phi 1/\phi 2) \times F_{DN}+(\phi 1 \times Tin/2r1 \times tan(\theta+\alpha n)) \times [1 - \frac{1}{2}(tan\ h) \lambda \times r1 \times \phi 1)/\lambda \times r1 \times \phi 1 + tan\ h(\lambda \times r2 \times \phi 2)/\lambda \times r2 \times \phi 2)] \quad \text{Equation 1}$$

where, $F_{DV}$ is a shaft force on the driving side pulley (secondary pulley), $F_{DN}$ is a shaft force on the driven side pulley (primary pulley), $\phi 1$ is a driving side pulley belt winding angle, $\phi 2$ is a driven side pulley belt winding angle, r1 is a driving side pulley effective radius, r2 is a driven side pulley effective radius, and Tin is a torque input (engine torque).

Simplifying the equation 1 above, the equation 2 is obtained as follows;

$$F_{DV}=(\phi 1/\phi 2) \times F_{DN}+Tin \times f(I_p) \quad \text{Equation 2}$$

where, $f(I_p)$ is a function which depends on the pulley ratio (r2/r1).

In short, the driving side shaft force $F_{DV}$ which is balanced with the driven side shaft force $F_{DN}$ requires a force that increases in magnitude with the input torque Tin. If both shaft forces are made to be substantially equal by means of the aforementioned N control, the relationship between the shaft forces becomes as in the following equation 3.

$$F_{DV}\ (\text{actual value}) \approx F_{DN} < (\phi 1/\phi 2) \times F_{DN}+Tin \times f(I_p)=F_{DV}(\text{calculated value}) \quad \text{Equation 3}$$

In this instance, if the calculated value (theoretical value) in equation 3 is controlled to establish the relationships: $\phi 1 < \phi 2$ and $F_{DV} \approx F_{DN}$, the shaft force on the driving side (secondary side) pulley becomes excessive, causing the shaft force difference $\Delta F_{DV}$ to close the driving side pulley and the pulley ratio of the CVT to converge on the neutral condition in O/D direction. In other words, the CVT converges on the GN point with the difference $\Delta F_{DV}$ between the actual value and the calculated value (theoretical value) of aforementioned shaft forces ($\Delta F_{DV}=F_{DV}$(actual value)— $F_{DV}$(calculated value)), which load value difference ($\Delta F_{DV}$) increases with input torque (Tin).

FIG. 8 shows a relationship between the input torque Tin ($=T_E$: engine output torque) and the convergence power $\Delta F$ based on Ogasawara's equation 1 above. It is clear from FIG. 8 that the input torque Tin increases at each pulley ratio (1.3, 1.0, 0.8, GN), the convergence power $\Delta F$ increases, and if the convergence power increases, the convergence speed increases.

The above description is an explanation of the case in which the shaft forces for both primary and secondary pulleys are made equal, but the aforementioned neutral control is possible even in the case when the creep torque is made 0 by changing the pressure receiving area of the hydraulic chambers of both hydraulic actuators (Ap>As), for example, which will be described next. Hereafter a case in which there is a shaft force difference is described.

In the D range, the secondary pulley becomes the drive side, hence equation 2 above changes to equation 4 below.

$$Fs=(\phi s/\phi p) \times Fp+Tin \times f(Ip) \quad \text{Equation 4}$$

where, subscript s denotes the secondary side and subscript p denotes the primary side.

In R range the primary side becomes the drive side, hence equation 5 is obtained.

$$Fp=(\phi p/\phi s) \times Fs+Tin \times f(Ip) \quad \text{Equation 5}$$

Solving equation 5 for Fs, equation 6 is obtained.

$$Fs=(\phi s/\phi p) \times Fp-Tin \times f(Ip) \times \phi s/\phi p. \quad \text{Equation 6}$$

Figure 12:
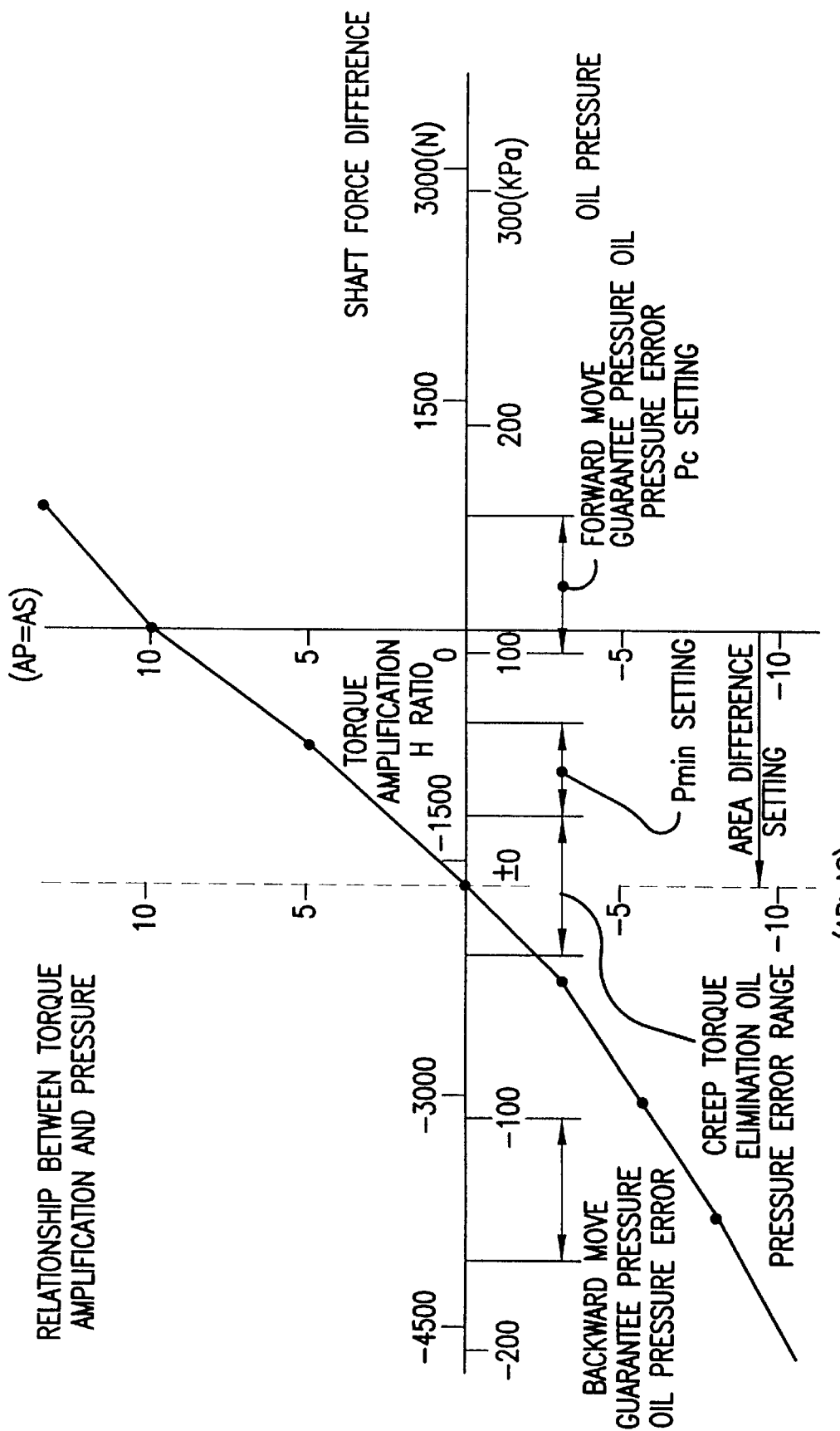
FIG. 12 is a graph showing the relationship between torque amplification ratio, and shaft force difference and oil pressure difference of both pulleys during creep generation.
Figure 14:
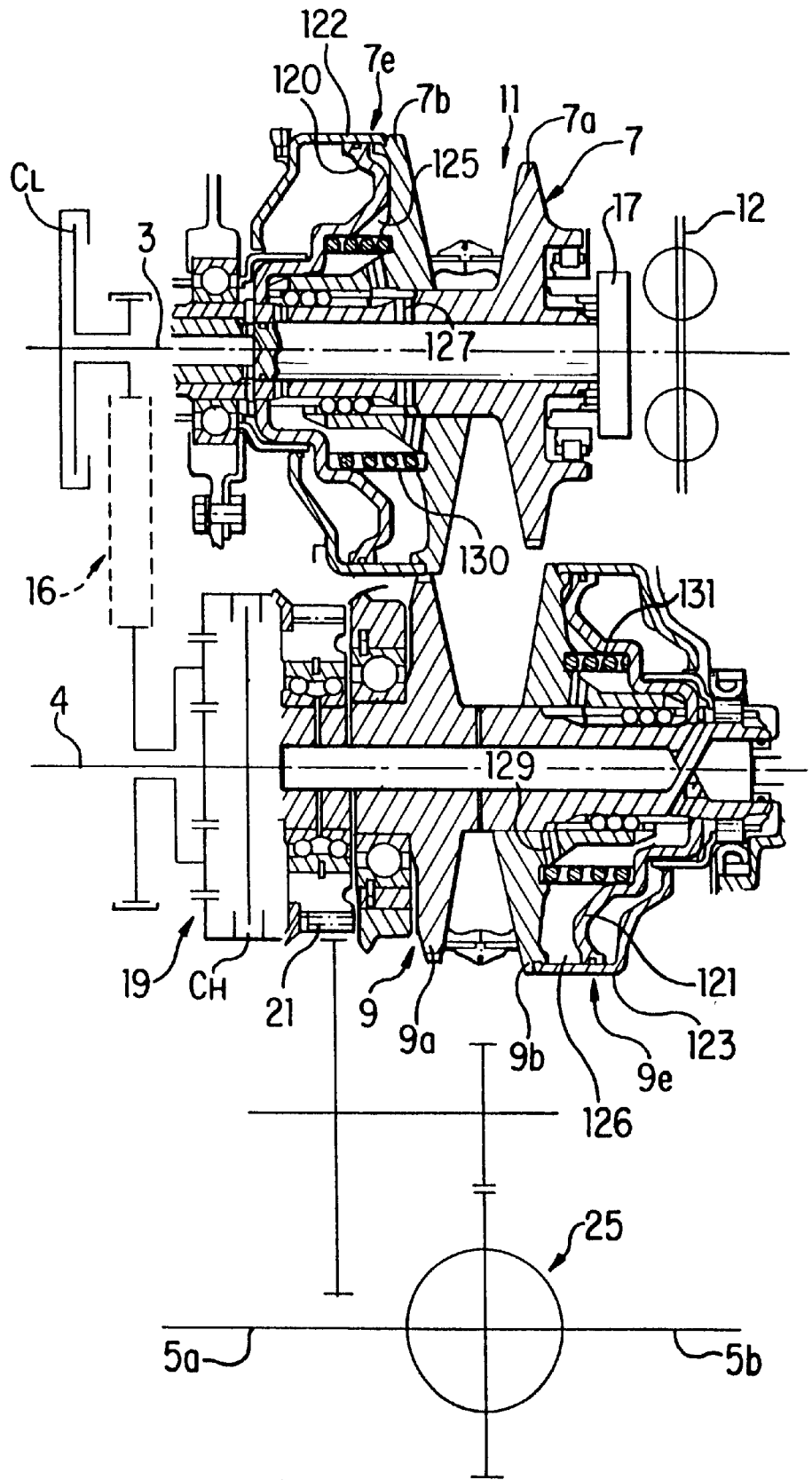
FIG. 14 is a front elevation view in partial cross section of an infinitely variable transmission according to another configuration of the invention.

In the D range, a predetermined oil pressure is supplied, causing relatively weak shaft forces to be applied on both pulleys, so that the CVT downshifts to the GN point. For example, in the case of hydraulic actuators 7c, 9d which are of the double chamber type with an area difference (Ap>As) in the first hydraulic chambers 55, 56 as shown in FIG. 12, explained later, oil pressure is supplied to the first hydraulic chambers 55, 56 and oil pressure of the second hydraulic chambers 57, 59 is released (see FIG. 6). In the case of hydraulic actuators 7e, 9e which are of the single chamber type made of hydraulic chambers 125, 126 with an area difference (Ap>As) as shown in FIG. 14, explained later, a predetermined low pressure is supplied from the low regulator valve 71$_2$, shown in FIG. 15, to both hydraulic chambers 125, 126. The aforementioned area differences are established in such a manner that the creep torque, explained later, becomes 0 at GN point, namely $F_{DV}/F_{DN}$=GN point.

The left hand side (Fs) of aforementioned equation 4 becomes small due to the shaft force difference (Fp>Fs) and the input torque Tin, causing CVT to downshift to the GN point. Furthermore, if the CVT passes the GN point and tries to enter a reverse range, the left hand side of equation 6 increases by ($-Tin \times f(Ip) \times (\phi p/\phi s)$) (Fs>a predetermined quantity), causing the CVT to converge to the GN point in this case as well.

Figure 9:
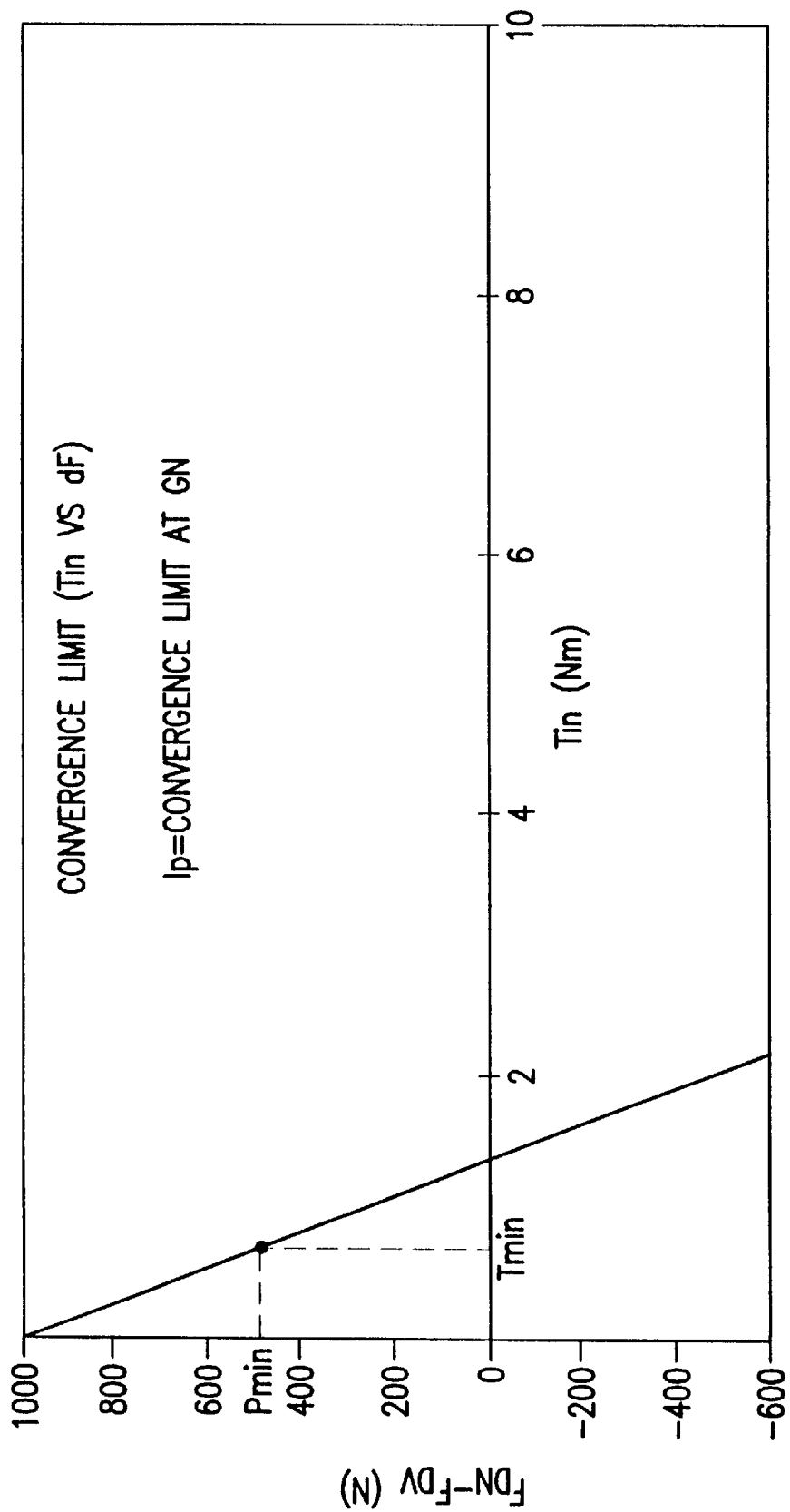
FIG. 9 is a graph showing the relationship between the shaft force difference for the driving and driven pulleys and input torque during neutral control.

In the above explanation, the difference of pressure receiving area of both hydraulic actuators is set to become ($F_{DV}/F_{DN}$=GN point), which is a special value, but convergence to the GN point is possible for other points. FIG. 9 shows a relationship between the shaft force difference ($F_{DN}$–$F_{DV}$) for convergence to said GN point such that the pulley ratio Ip at the GN point is 0.692. In the case of the aforementioned special value ($F_{DV}/F_{DN}$=GN point; with vertical axis 1000 (N)), convergence to GN point occurs even if the input torque is 0, but if the shaft force difference is smaller than that, convergence to the GN point occurs, by inputting input torque Tin which is on the right side of the line to the CVT, and the convergence speed increases due to the input torque.

For example, when the minimum oil pressure Pmin is applied to the secondary pulley, preventing the occurrence of a reverse move during the D range, which may be caused by n oil pressure error, predetermined input torque Tmin needs to be input into the CVT to enable convergence to the GN point, with the convergence speed increasing with said input torque.

In normal transmission control by the ratio control valve 72, oil pressure to be supplied to the second hydraulic chamber in the secondary side is reduced, and the drain speed for such pressure reduction is set according to the target transmission speed in the case of the down-shifting pulley. Once the target pulley ratio is obtained, the drain is stopped and the feedback is controlled to maintain the pulley ratio. In other words, it is different from changing the speed by setting the oil pressure of both hydraulic actuators to certain value corresponding to the pulley ratio. The reason is that the shaft force balance equation of the aforementioned equation 2 contains input torque Tin and it is extremely difficult to estimate the input torque and to change the oil pressure accordingly.

Even in the case of the N control mentioned above, it appears possible to maintain the pulley ratio Ip at the GN point by stopping the drain as soon as the GN point is obtained, as in the case of the aforementioned transmission control, but in reality, the pulleys move due to oil leakage, and efforts to maintain at the GN point by feedback control is too late and impossible. In the case when down-shift continues beyond the GN point because the drainage is not stopped, the left hand side of aforementioned equation 6 becomes even smaller, causing up-shift in reverse and not returning to the GN point. Incidentally, the left hand side may become large by increasing the input torque Tin in equation 6, but such increase of input torque Tin is too large to be practical.

During the transmission control shown above, drainage of the second hydraulic chamber of the hydraulic actuator is stopped and the oil pressure which maintains the pulley ratio Ip at the predetermined position against the shaft force of the pulley operates, but during the N control, oil pressure of both second hydraulic chambers, for example, is drained, only maintenance pressure operates by both first hydraulic chambers, and transmission of torque is executed by the belt between both pulleys in the CVT. However, the transmission of torque is executed with a predetermined low shaft force so that the pulley ratio may be changed by the shaft force from the belt.

Figure 10:
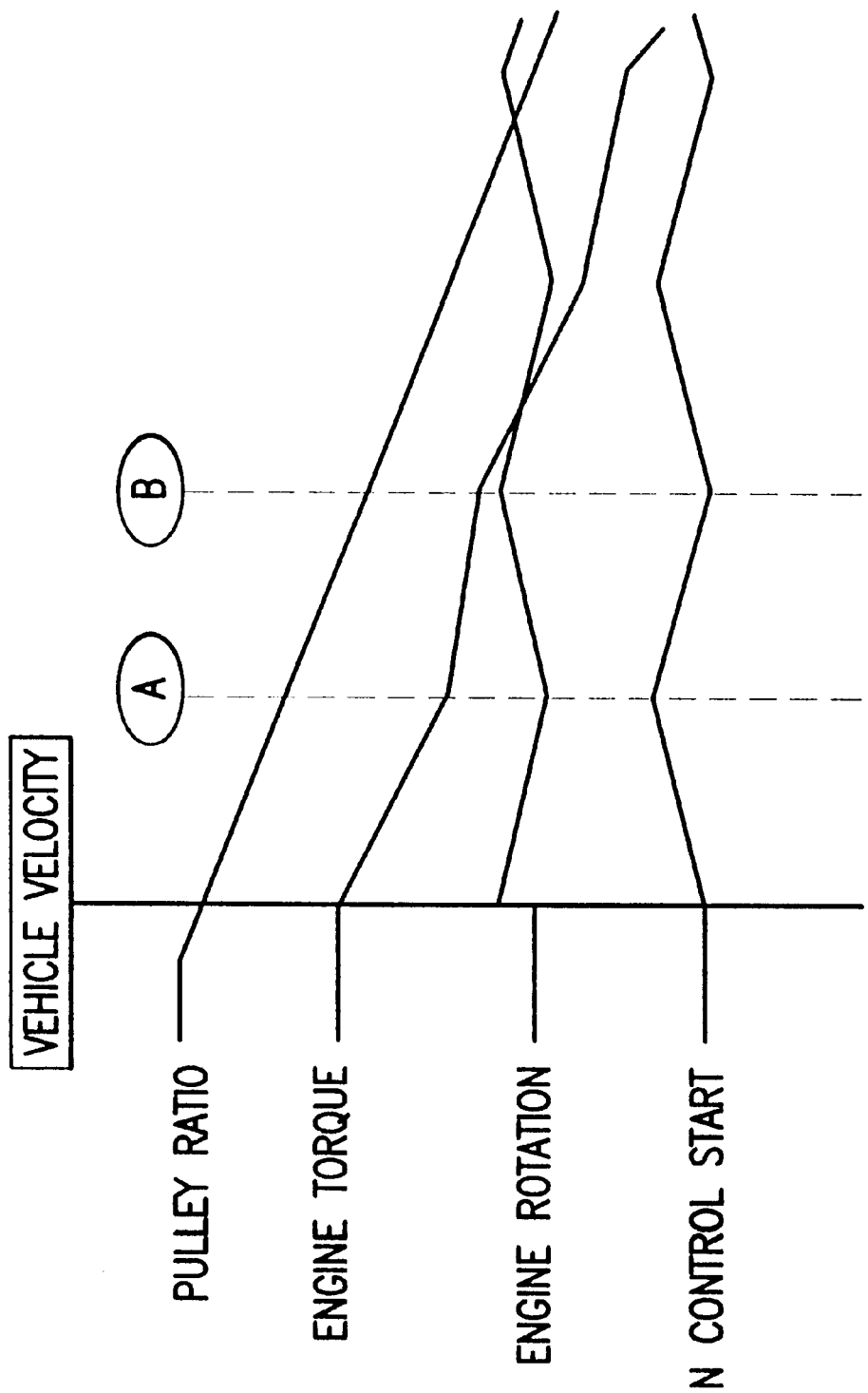
FIG. 10 is a graph showing the interrelationship between vehicle velocity, pulley ratio, engine torque and engine rotations as the neutral point is approached by controlling input torque during N control.

A convergence mechanism of N control, which is accomplished by controlling the input torque, namely the engine torque (in the case when the degree of throttle opening is made constant) is shown hereafter, with reference to FIG. 10. In the vehicle deceleration (coast) state in which the throttle pedal is released or the brake pedal is pushed with or without application of the throttle pedal, N control is started when the vehicle speed drops below a predetermined value, the output torque (input torque of CVT) is increased by said N control, and the pulley ratio of the CVT self-converges at high speed towards the GN point as shown before, causing the number of engine rotations to increase, which, in turn, causes a gradual decrease in the engine torque.

The convergence speed becomes slower with the decrease of the engine torque, which controls the increase in the number of engine rotations. Meanwhile, the deceleration of vehicle speed continues, hence, the number of engine rotations decreases when the convergence of the CVT shown above no longer is able to keep up with deceleration of the vehicle (A→B). Since the engine torque increases with the decrease in the number of rotations of the engine, the convergence speed again increases and is able to keep up with the deceleration of the vehicle (after B). This cycle is repeated thereafter, causing the pulley ratio of the CVT to converge to the CN point and the vehicle comes to stop.

Figures 11, 11A:
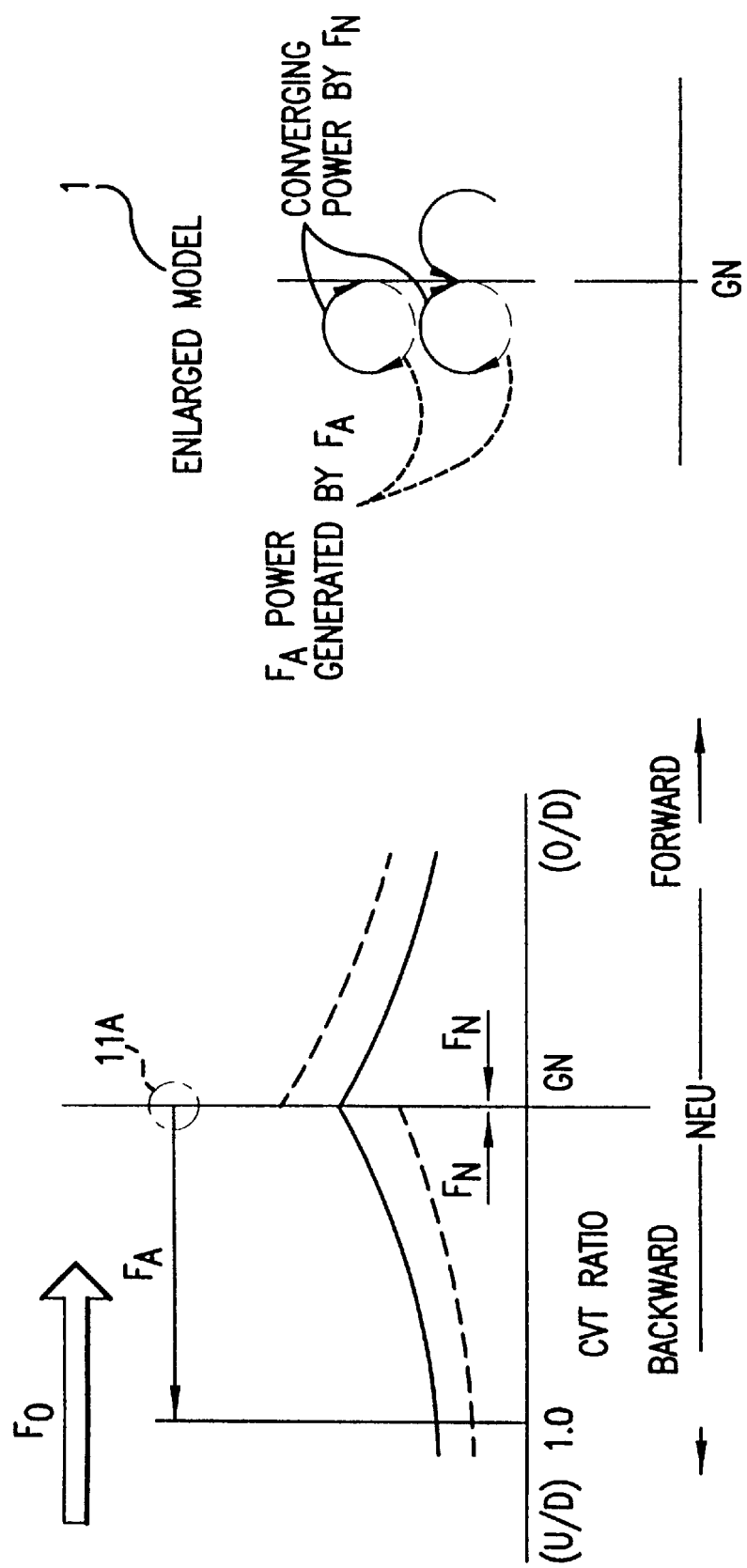
FIG. 11 is a graph showing a mechanism for generating creep torque.

The principle of creep torque generation of an automatic infinitely variable transmission (IVT) 1 in which the aforementioned CVT becomes neutral at the GN point is shown hereafter, with reference to FIG. 11. In the past, an automatic transmission (A/T) comprising a multi-stage transmission mechanism such as planetary gears is equipped with a torque converter (starting apparatus) between the engine output shaft and the multi-stage transmission mechanism input shaft, which torque converter provides a torque that increases corresponding to the number of engine rotations to said input shaft (stall torque) and starts the vehicle smoothly. The automatic infinitely variable transmission 1 mentioned above is automatically maintained in the neutral position by means of N control and generates a torque (creep torque) in the same forward direction as the aforementioned torque converter during said neutral state.

As stated before, a force $F_N$ is generated so that the CVT self-converges to the GN point from the forward moving range or from the backward moving range, and the CVT becomes the no load state or the infinitely close to no load state by reaching said GN point. The CVT 11 a state where the primary pulley and the secondary pulley are acted on by the belt tension, namely a state where the pulley ratio is 1.0 is a stable state, hence, force $F_A$ is generated toward said pulley ratio 1.0. Hence, said CVT approaches the GN point and the automatic infinitely variable transmission (IVT) 1 becomes the no load state, and at the same time, the force $F_A$ toward the pulley ratio 1.0 which comprises the stable convergence point of the CVT itself is generated. The force $F_A$ toward the pulley ratio 1.0 at the aforementioned no load state and the force $F_N$ toward GN point at the negative load state created by the CVT deviating from the GN point due to said force $F_A$ creates a state of turbulence which generates forward creep torque.

When shaft force $F_O$ in the direction of O/D is applied to the CVT to counter the force $F_A$ toward the pulley ratio 1.0 by providing area difference between the first hydraulic chambers 55, 56 of the primary and the secondary side, the aforementioned force $F_A$ is off-set and the forward creep torque is eliminated. The aforementioned shaft force $F_A$ and $F_O$ are not affected by the input torque or transmission efficiency, hence, an arbitrary creep torque may be obtained by providing beforehand a predetermined amount of bias from the equal values to the shaft forces of the primary and the secondary pulleys during N control.

FIG. 12 shows a relationship between the shaft force difference (upper stage) of said primary and secondary pulleys, the difference of supplied oil pressure (lower stage) and the creep torque with the upper stage of horizontal axis denoting the shaft force difference of the secondary pulley relative to the primary pulley, and the upper part and lower part of vertical axis denoting the torque amplification ratio in the forward direction and in the backward direction respectively. When the effective pressure receiving areas of the first hydraulic chambers 55, 56 in both the primary and the secondary pulleys 7, 9 are equal (Ap=As) as shown in FIG. 1, the shaft force difference relative to both pulleys become 0 and a creep torque having predetermined torque amplification ratio is generated in the forward direction. The lower stage of the horizontal axis shows the difference in oil pressure being supplied to the secondary side hydraulic actuator relative to oil pressure being supplied to the primary side hydraulic actuator in the infinitely variable transmission which is set to make the creep torque nearly 0 when equal oil pressure is supplied to both hydraulic chambers by providing difference in the effective pressure receiving areas of the primary side and the secondary side hydraulic actuators (Ap>As). In this state, if the automatic infinitely variable transmission 1 is guaranteed to be in forward state and the creep torque in forward direction is set by a torque similar to a conventional torque converter, a differential pressure Pc is supplied to the secondary side hydraulic chamber which is higher than the primary side hydraulic chamber. In the forward moving guarantee oil pressure range mentioned above, the predetermined forward creep torque is generated even during N control and the vehicle creeps forward when the brake is released.

Moreover, the aforementioned $F_A = F_0$ state is achieved by providing area difference in the hydraulic chambers of both pulleys (Ap>As), and the creep torque becomes 0. However, in an actual control operation, there is an error in the oil pressure being set, in the range of which error backward direction torque is often generated in spite of the intention of a driver to move forward, hence, a range Pmin is established in forward direction which is a range guaranteeing that the vehicle does not actually move forward (less than the torque needed to move the vehicle) by supplying slight differential pressure to the secondary side. In the range of said Pmin, the vehicle maintains the still state even when the brake pedal is released during the N control.

When a higher oil pressure is supplied to the hydraulic chamber in the primary pulley than the secondary side, the range of oil pressure error becomes a range which guarantees the automatic infinitely variable transmission to be in the backward moving state. In the backward moving guarantee oil pressure range, a backward moving creep torque is generated even under N control state, hence, the vehicle creeps backward when the brake pedal is released.

Figure 13:
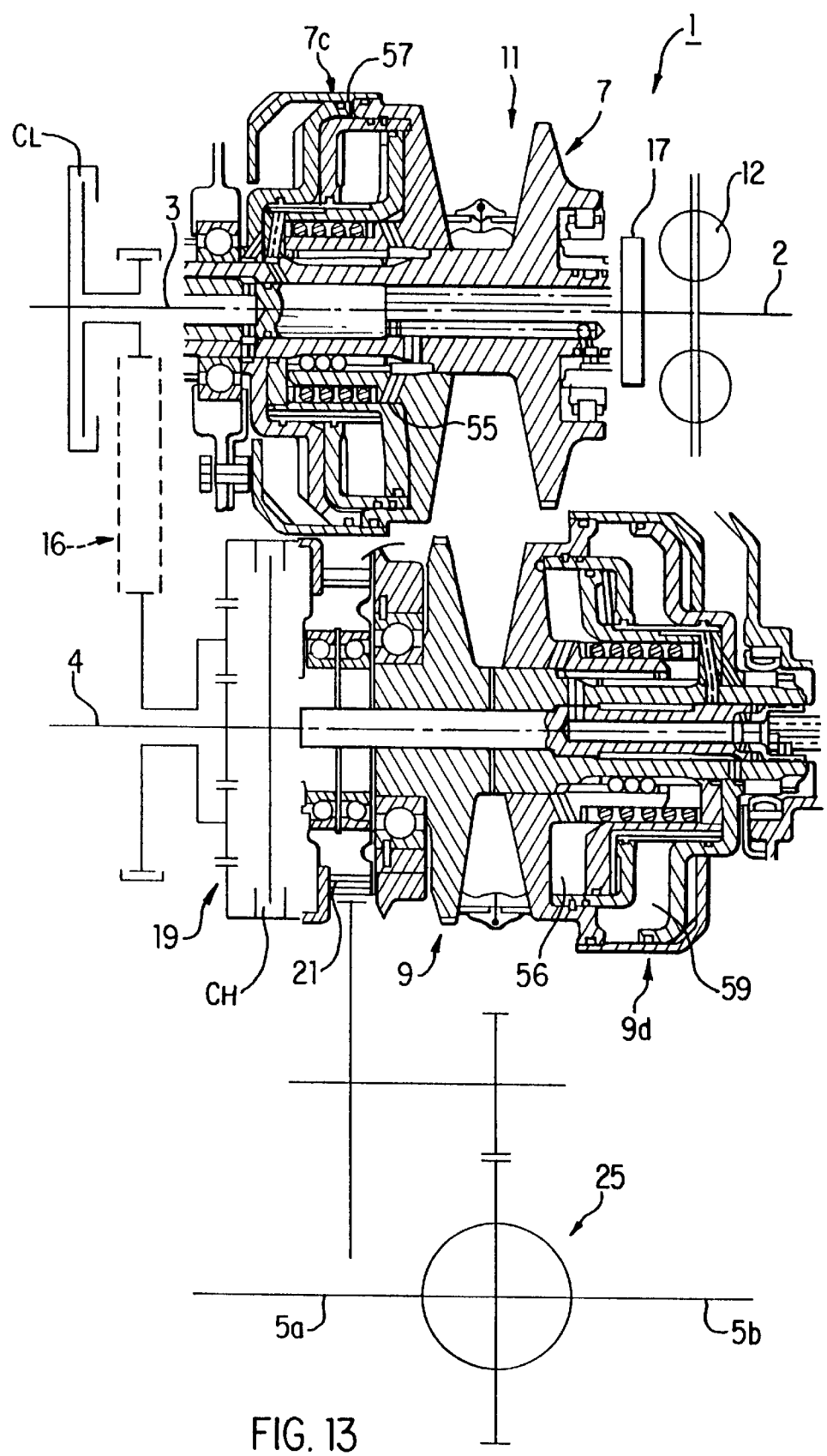
FIG. 13 is a front elevation view in partial cross section of the infinitely variable transmission in which effective pressure receiving area is changed.

An embodiment in which the creep torque is made to become nearly 0 if the equal oil pressure is supplied to the first hydraulic chambers of both primary and secondary pulleys is shown hereafter, with reference to FIG. 13. In FIG. 13, the primary pulley side hydraulic actuator 7c is the same as the one in FIG. 1 but the secondary pulley side hydraulic actuator 9d is slightly different. The effective pressure receiving area of the second hydraulic chamber 59 of the secondary pulley side hydraulic actuator 9d is the same as that of the second hydraulic chamber 57 on the primary side, but the effective pressure receiving area (As) of the first hydraulic chamber 56 is set to be smaller by a predetermined amount than the area (Ap) of the first hydraulic chamber on the primary side (Ap>As). Hence, during the N control where the oil pressure of both second hydraulic chambers 57, 59 in the primary and the secondary side are released and where same predetermined oil pressure is supplied to both first hydraulic chambers 55, 56, the shaft force Fs of the secondary pulley 9 becomes smaller by a predetermined amount than the shaft force Fp of the primary pulley 7. This difference of the shaft force of both pulleys, (Fp–Fs), becomes said force $F_0$ which opposes the force $F_A$ toward the aforementioned pulley ratio 1.0, and $F_0$ off-sets the creep torque in forward direction. In this state, the creep torque becomes substantially 0 and the vehicle is maintained in the still position even if the brake is released during the N control.

Figure 15:
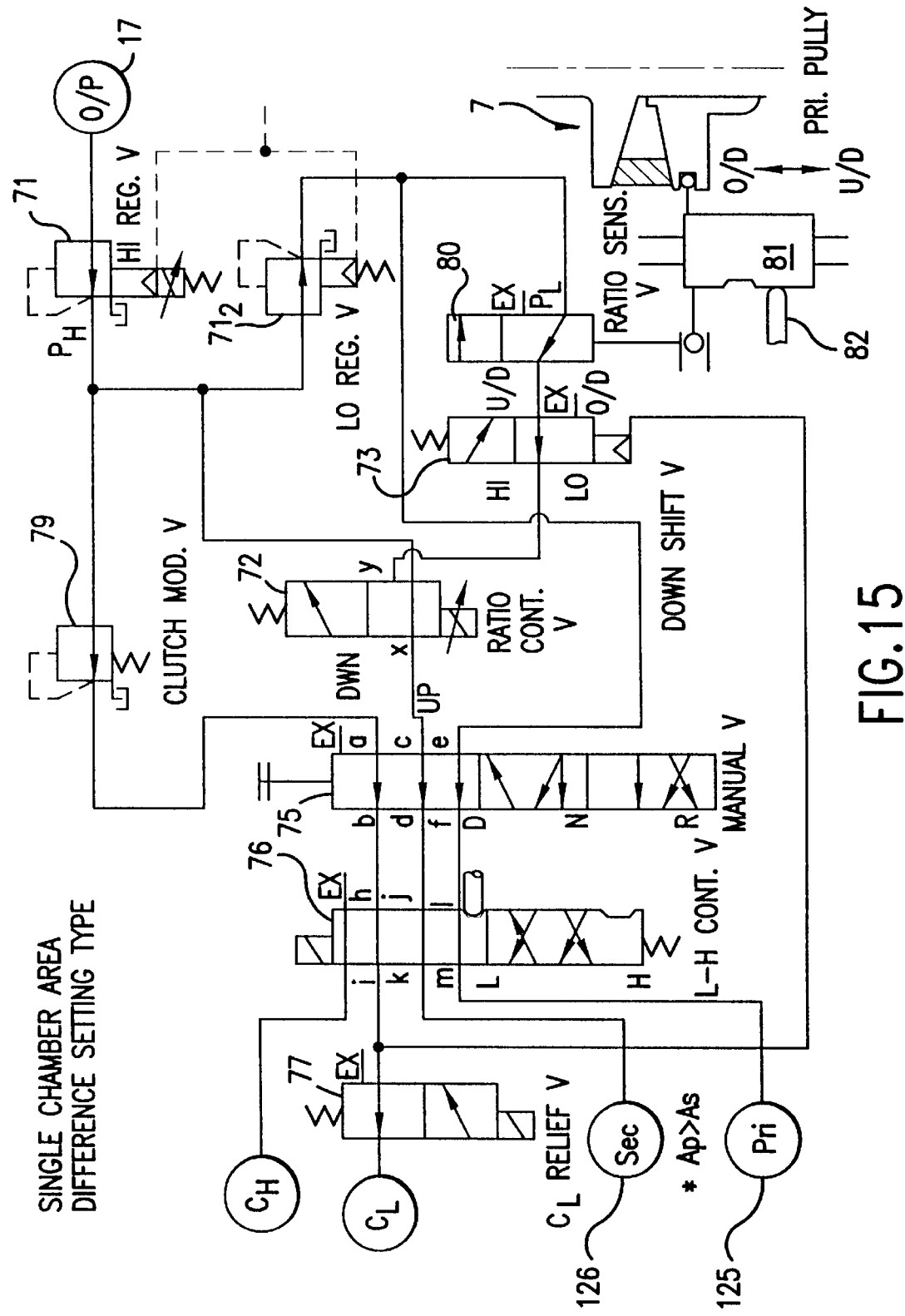
FIG. 15 is a schematic diagram showing a hydraulic control mechanism of the infinitely variable transmission shown in FIG. 14.

A partially modified infinitely variable transmission and a hydraulic control mechanism is shown hereafter, with reference to FIG. 14 and FIG. 15. The present infinitely variable transmission 1 is same as the previous configuration of the embodiment except for the difference in the hydraulic actuator, hence, the same parts will be denoted with the same symbols and the explanation will be omitted.

Each of flange members 120, 121 is anchored on the edge of the boss units of the fixed sheaves 7a, 9a in the primary and the secondary pulleys 7, 9, and the drum members 122, 123 are anchored on the back side of the movable sheaves 7b, 9a. The hydraulic chambers 125, 126 are formed between the back of the movable sheaves 7b, 9b and the flange members 120 and 121, and each of the single chamber type hydraulic actuators 7e, 9e are arranged on the primary side and the secondary side. Oil pressure is supplied to the aforementioned hydraulic chambers 125, 126 through the oil paths 127, 129 respectively and springs 130, 131 for pre-loading are provided in compressed form.

With the aforementioned primary and secondary side hydraulic actuators, the effective pressure receiving area Ap of the primary side hydraulic chamber 125 is set larger than the effective pressure receiving area As of the secondary side hydraulic chamber 126 by a predetermined amount (Ap>As), and is set so that the creep torque becomes virtually 0 when the same oil pressure is supplied to both hydraulic chambers 125, 126.

FIG. 14 shows a hydraulic control mechanism which is applied to the hydraulic actuators 7e, 9e that are made of a single chamber with the hydraulic control mechanism differing from the one in FIG. 6 in that it has two regulator valves. The present hydraulic control mechanism has a high regulator valve $71_1$ and a low regulator valve $71_2$.

In the D range mode, oil pressure adjusted by the high regulator valve $71_1$ is supplied to the low clutch hydraulic servo $C_L$ through the clutch modulation valve 79, the ports a, b of the manual valve 75, the ports h, i of the low-high control valve 76 and the low clutch relief valve 77, and, after being adjusted by the ratio control valve 72, is supplied to the secondary side hydraulic chamber 126 through the ports c, d of the manual valve 75, and the ports j, k of the low-high control valve 76. Meanwhile, oil pressure from the low regulator valve $71_2$ is supplied to the primary side hydraulic chamber 125 through the ports e, f of the manual valve 75 and the ports l, m of the low-high control valve 76.

As a result, high pressure based on the high regulator valve $71_1$ is applied to the secondary side hydraulic chamber 126 while constant pressure made of low pressure based on the low regulator valve $71_2$ is supplied to the primary side hydraulic chamber, and the speed of the CVT 11 is changed through appropriate adjustment of said high pressure by the ratio control valve 72.

During the N control, the ratio control valve is switched to down, and the constant low pressure from the low regulator valve $71_2$ is supplied to the secondary side hydraulic servo 126 through the ratio sensing valve 80, the down shift valve 73, the ports x, y of the ratio control valve 72, the ports c, d of the manual valve 75, and the ports j, k of the low-high control valve 76.

As a result, equal oil pressure from the low regulator valve $71_2$ is applied to the primary side hydraulic chamber 125 and the secondary side hydraulic chamber 126, and the creep torque becomes virtually 0 based on the difference of the area in both hydraulic chambers (Ap>As).

During the D range high mode, the low-high control valve 76 is switched, oil pressure from the clutch modulator valve 79 is supplied to the high clutch oil pressure servo $C_H$, and constant low pressure from the low-regulator valve $71_2$ is supplied to the secondary side hydraulic chamber 126 while high pressure from the high regulator valve $71_1$ is supplied to the primary side hydraulic chamber 125 and said high pressure is appropriately adjusted by the ratio control valve 72.

In this instance, in the hydraulic actuator shown in FIG. 14, the difference in area is provided in both hydraulic chambers to make the creep torque becomes virtually 0 as in the case of FIG. 13, but it is clear that equal oil pressure may be supplied to both hydraulic chambers and generate creep torque in the forward direction without providing difference in area in both hydraulic chambers as in the case of FIG. 1.

Figure 16:
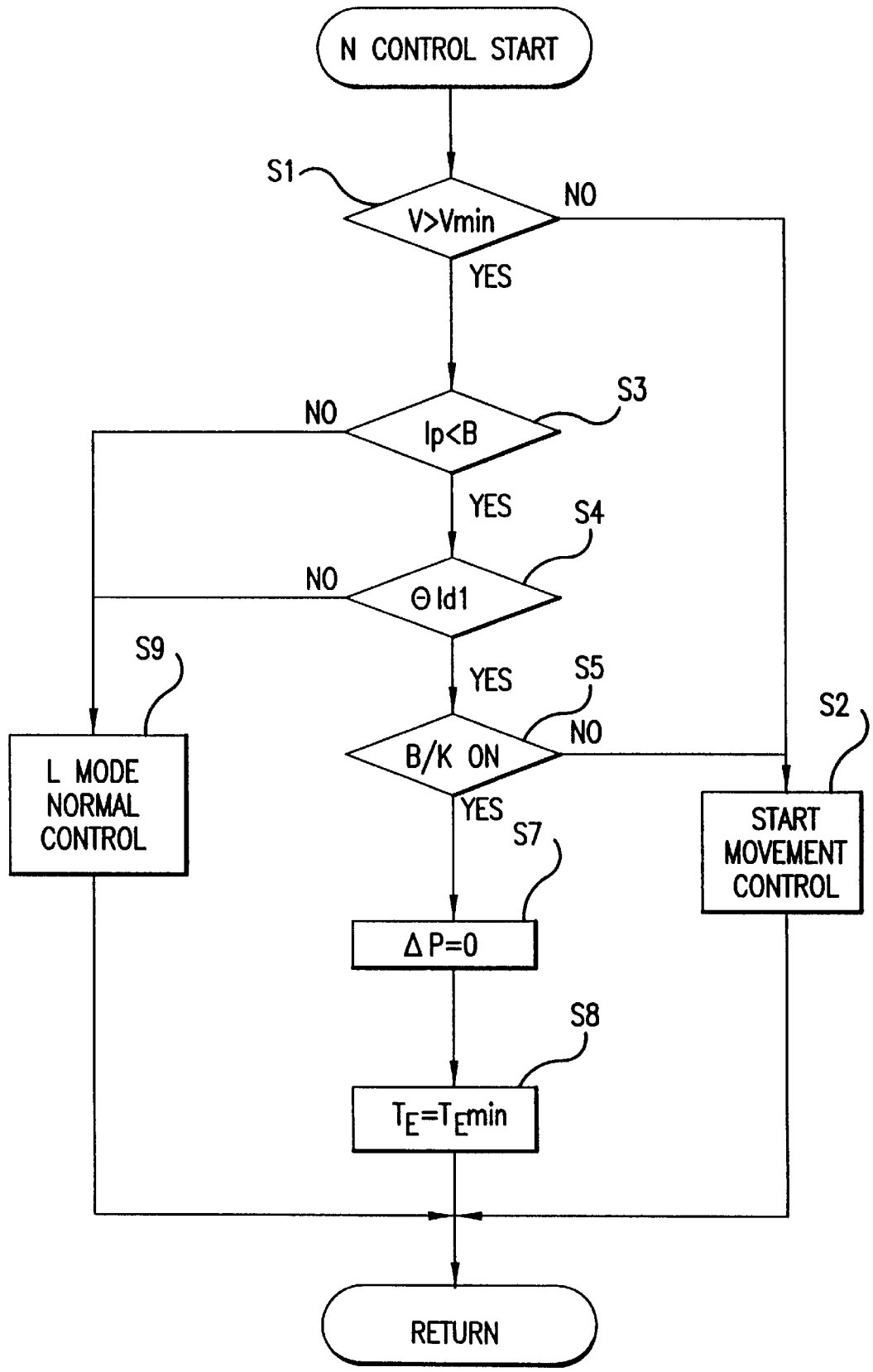
FIG. 16 is a flow chart showing the steps associated with N control.
Figure 17:
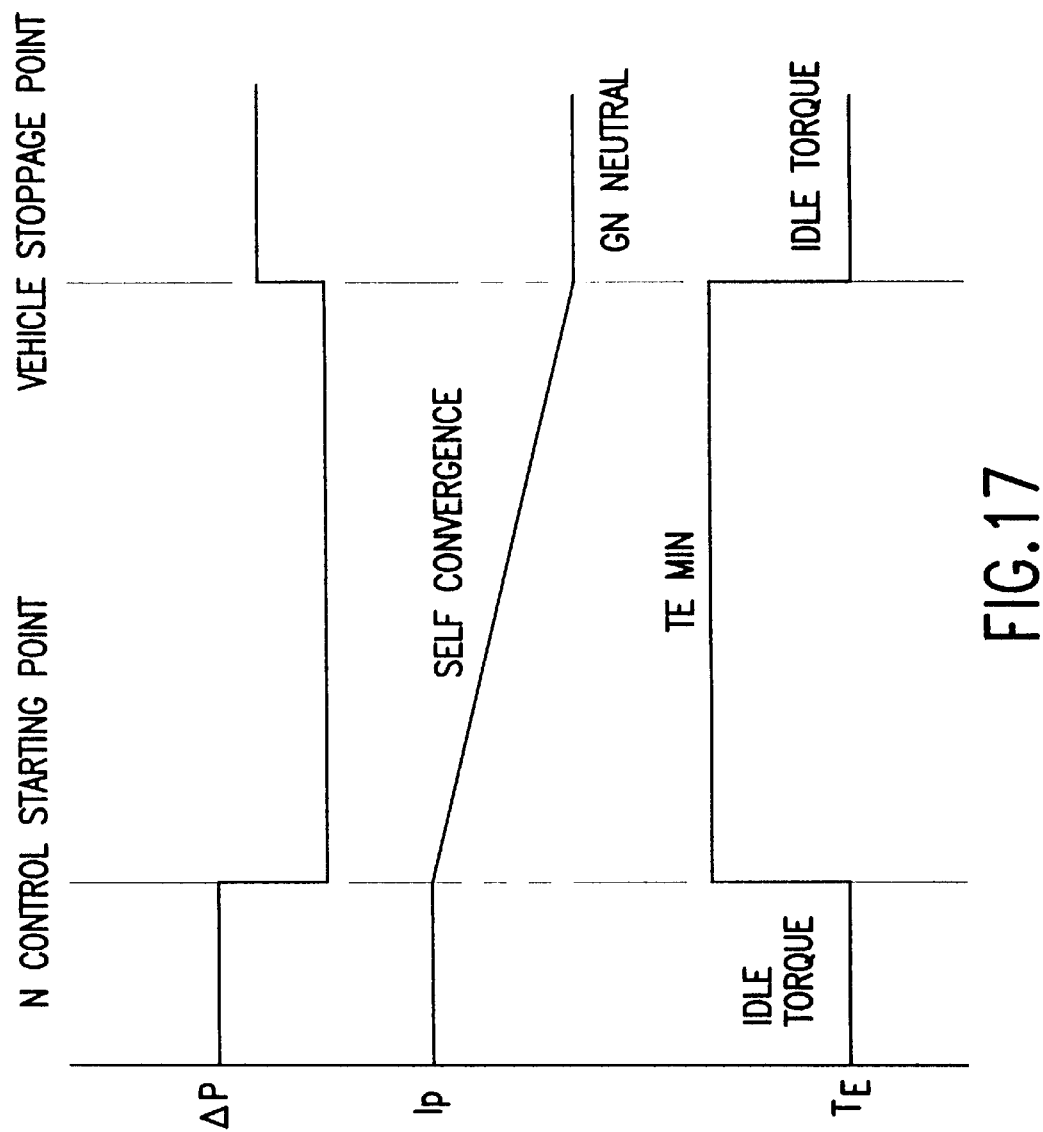
FIG. 17 is a timing chart showing the interrelationship of events during N control.

The aforementioned N control is shown hereafter, with reference to the flow chart shown in FIG. 16 and the time chart shown in FIG. 17. First, the vehicle velocity V is determined if V is in the predetermined low velocity Vmin (S1), and if V is determined to be smaller than said low velocity (V<Vmin), starting control, explained later, is executed (S2). Moreover, if the vehicle velocity is larger than a predetermined low velocity (V>Vmin), the pulley ratio Ip of the CVT 11 is smaller than the pulley ratio B (1.3) shown in aforementioned FIG. 4, for example (S3), the axle pedal is in the idle state (S4), and the brake pedal is in the depressed state (S5), and N control is enabled. In other words, the neutral state is determined to be needed when detection is made that V is smaller than the predetermined low velocity (Vmin) based on the signals from the vehicle speed sensor 93, the pulley ratio of CVT 11 that is computed based on the input rotation sensor 91 and the signals from the secondary shaft rotation number sensor being smaller than the predetermined value B, the idle state being enabled based on the throttle opening (driver) sensor 96, and the brake being in operation based on the brake switch 98 (determination means E).

Based on determination shown above, oil pressure of both the primary and the secondary second hydraulic chambers 57, 59 is released in the case of the double chamber type hydraulic actuators as shown in FIG. 1, FIG. 6 and FIG. 13, but predetermined low pressure from the low regulator valve $71_2$ are supplied to both hydraulic chambers 125, 126 (S7) in the case of the single chamber type hydraulic actuator as shown in FIG. 14 and FIG. 15. In other words, the aforementioned neutral control means N is started, making the difference ΔP in oil pressure being applied to both pulleys 0, and the engine torque is controlled so that the input torque of CVT becomes predetermined low value ($T_E=T_{Emin}$: S8). In short, said input torque control means Q starts operation. The input torque control of CVT through output torque control of the engine is executed by adjusting degree of throttle opening using the electronic throttle system 109. This engine control may be maintained at constant value where the output assumes a local minimum value ($T_{Emin}$) as shown in FIG. 17, or may change input torque with change in pulley ratio so that conversion speed becomes constant because the conversion speed may change with change in the pulley ratio even if input torque is equal (see FIG. 8).

The aforementioned engine control may be executed in such a manner that a coasting state does not occur and that the converging power becomes constant torque without assuming a negative value in the range where the pulley ratio is less than said predetermined pulley ratio B (1.3, for example) to improve transmission efficiency. In the vicinity of the GN point of the CVT, torque diverges toward an infinitely large torque, hence a negative torque (a coasting state where torque is transmitted from the wheels toward the engine) may prohibit smooth torque transmission. By maintaining always a positive torque state where torque is transmitted from the engine to the wheels, smooth torque transmission is always enabled.

Engine output may be controlled in such a manner that converging power is made to become larger or smaller as the pulley ratio approaches GN point, in addition to preventing aforementioned coasting state and converging power becoming negative.

As a result, N control is started as shown in FIG. 17 and, in the case of the hydraulic mechanism of FIG. 6, the N control solenoid 73a is turned off, the down-shift control valve 73 is in the D range low mode state with the port s being joined with the drain port EX, oil pressure DP which is supplied to the second hydraulic chamber 57 of the primary pulley is drained from the drain port EX through the ports m, l, f, e, s, substantially equal shaft force resulting only from the first hydraulic chambers 55, 56 respectively is applied to each of both pulleys 7, 9. Moreover, in the case of the hydraulic mechanism of FIG. 14, the down-shift valve 73 and the ratio control valve 72 are switched, the predetermined low pressure is supplied to the secondary side hydraulic chamber 126 from the low regulator valve $71_2$, predetermined equal low pressure is applied to both hydraulic chambers 125, 126, and substantially equal shaft force is applied to each of both pulleys 7, 9. At the same time, the degree of throttle opening of the engine is controlled so that the engine outputs torque of predetermined low value ($T_{Emin}$) from the idling stat, causing CVT 11 to converge to the GN point at relatively high speed.

When CVT reaches the GN point, the starting control state is enabled, and said minimum oil pressure Pmin is supplied to the primary side hydraulic chamber 125 in addition to the engine becoming idling torque generating predetermined creep torque during a control shown in FIG. 15, for example. In this instance, in said FIG. 17, oil pressure difference ΔP which is applied to both pulleys is made to be 0 in the N control state and said minimum oil pressure Pmin is applied in the starting control state where the vehicle is stopped, but said minimum oil pressure Pmin may be applied in the N control, or the hydraulic chambers of both hydraulic actuators may be made to have an equal pressure receiving area so that the forward creep torque may be obtained by supplying equal oil pressure, or the pressure receiving area of both hydraulic chambers may be changed slightly so that no creep torque may be generated.

In the meantime, in step S3 or S4, if the pulley ratio Ip is less than the predetermined value B (Ip<B) or if the throttle pedal is pushed to enable the non-idle state (Q≠idle), the normal transmission of low mode is executed (S9). Moreover, if the brake pedal is released at step S5 (B/KSW off), starting control (S2) is enabled.

Figure 18:
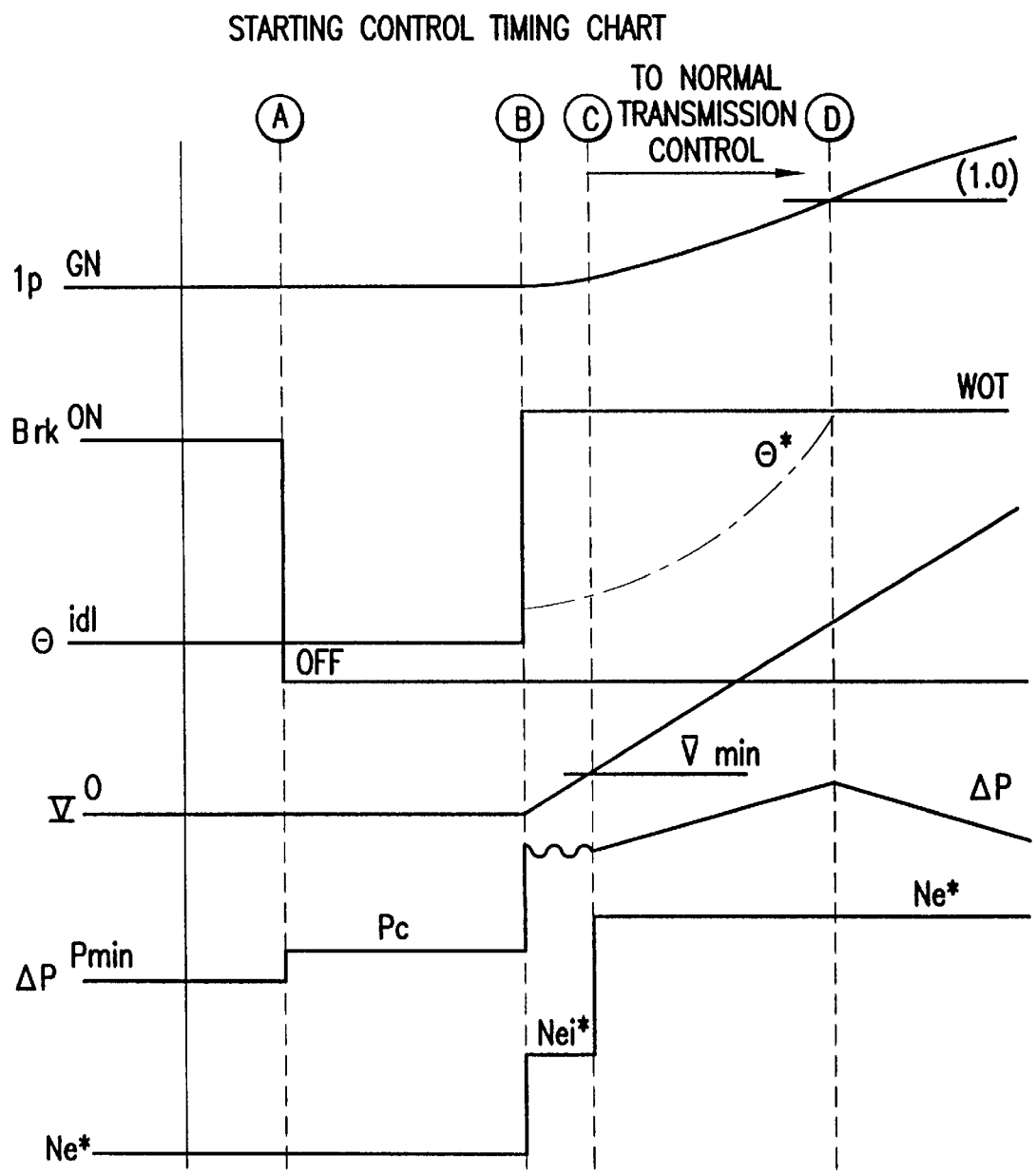
FIG. 18 is a timing chart showing the interrelationship of events during starting control.

The starting control in which the vehicle moves forward from said still state in the D range is shown hereafter, with reference to FIG. 18. When the vehicle is stopped, the pulley ratio Ip of CVT 11 is at the GN point, the brake $B_{rk}$ is in the ON (operation) state, the degree of opening of throttle θ is in the idle state, the oil pressure difference ΔP is at the minimum value Pmin which never causes movement of the vehicle, and the number of target engine rotations Ne* is at the predetermined minimum value (idle rotation number). When the OFF (release) state is enabled from the above state by releasing the brake pedal Brk as shown by point A, predetermined oil pressure is supplied to (second) hydraulic chambers 59 (or 126) in the secondary pulley (drive) side, making the oil pressure difference ΔP which is applied to both pulleys to be Pc, and a predetermined creep force is generated by the shaft force which is applied to both pulleys based on said oil pressure difference.

When the driver tries to start the vehicle by pushing the throttle pedal, it is necessary to substantially control the engine output torque by controlling the tolerance torque with the belt, because the automatic infinitely variable transmission 1 generates a large torque due to the torque circulation in the vicinity of the GN point, as shown by point B. Hence, the actual degree of throttle opening θ is maintained to be low against the amount of throttle pedal depression, WOT, by the command from the control unit. Moreover, in order to create characteristics in which stall torque is increased with the amount of throttle pedal depression similar to the torque converter characteristics of the normal automatic transmission (A/T), the number of engine rotations is controlled to become the predetermined target rotation Nei*, and oil pressure for the (second) hydraulic chambers 59 (or 126) in the secondary pulley side, which controls the pressure difference ΔP of both pulleys makes the direction of pressure difference move to the right in FIG. 11, resulting in an increase of creep force.

Figure 19:
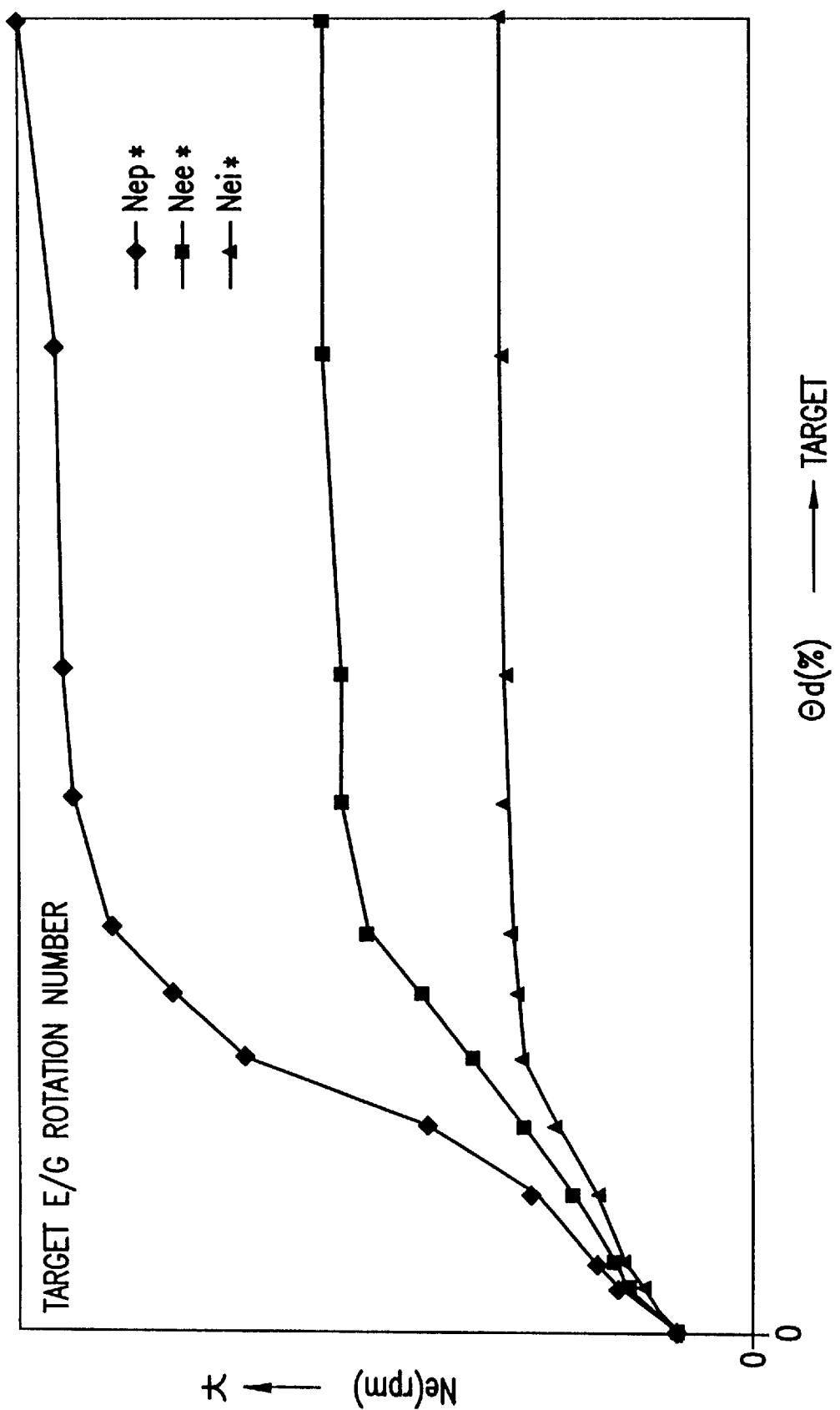
FIG. 19 is graph showing the target engine rotation number at each state.

With said creep force, the vehicle starts moving, the pulley ratio Ip of CVT 11 is changed slightly in the direction of U/D, and when the vehicle velocity reaches the predetermined low velocity Vmin, the control operation moves from the aforementioned starting control to a normal transmission control, and the number of engine rotation is set to the target rotation number Ne* of the normal time, as shown by point C. In other words, during the starting time control, in order to generate said predetermined creep torque (stall torque), the number of engine rotations Ne is held to be low against each degree of throttle opening θd as shown in Nei*, but during normal transmission control, the number of engine rotations Ne is controlled based on the maximum output characteristics Nep* or the optimum fuel efficiency characteristics Nee*. Moreover, in this state, the starting torque increases with the shaft force of the secondary pulley, the pulley ratio of CVT is changed in the direction of U/D, and the vehicle velocity V increases, as shown in FIG. 19.

When the pulley ratio of CVT becomes about 1.0, restriction of the degree of throttle opening θ* by the input torque restriction which prevents excess torque to act on said infinitely variable transmission such as a belt, makes the degree of throttle opening equal to the amount of throttle pedal push by the driver, as shown by the point D.

In this instance, the explanation given above shows forward moving with the shift lever in the D range, but if the shift lever is in the R range and the vehicle starts in the backward direction, predetermined oil pressure is supplied to the (second) hydraulic chambers 57 (or 125) on the primary side, making the oil pressure within backward motion guarantee an oil pressure error range in FIG. 12 and the similar creep force is generated towards backward movement direction. Except for this, the operation is same as that shown in FIG. 18. An internal combustion engine is used as a torque source, but an electric motor may also be used so that the present invention may be applied to electric vehicles.

What is claimed is:

1. An infinitely variable transmission comprising:
   an input shaft, the input shaft being interlocked with an output shaft of a torque source,
   an output member connected to wheels on a vehicle,
   a belt type continuously variable transmission apparatus having a primary pulley and a secondary pulley, the primary pulley being interlocked with said input shaft, a belt being wound around said first and second pulleys and a shaft force operating means for controlling a shaft force on each of said pulleys in order to change a pulley ratio of said continuously variable transmission;
   a planetary gear system having at least first, second and third rotational elements, a torque transmission direction between said pulleys being changed based on the change of the pulley ratio of said continuously variable transmission as well as control of said first rotational element being interlocked with said input shaft, said second rotational element being interlocked with said secondary pulley and said third rotational element being interlocked with said output member respectively so that an output torque direction of said output member is changed;
   a determination means for determining, based on the signals from a detection means for detecting a wheel running condition, whether a neutral condition is needed with the number of rotations of said output member being 0;
   a neutral control means for controlling said shaft force operating means so that a difference between the shaft force operating on said primary pulley and the shaft force operating on said secondary pulley is within a predetermined range when said determination means determines that a neutral condition is needed, and
   an input torque control means for controlling the torque source so that a predetermined torque is input into said input shaft during operation of said neutral control means.

2. The infinitely variable transmission of claim 1, wherein said neutral control means controls said shaft force operating means to maintain power transmission by means of the belt between said pulleys and said shaft force on each of said pulleys is controlled to make the pulley ratio of said continuously variable transmission converge to said neutral condition with a shaft force on one pulley being larger or smaller than a shaft force on the other pulley as a result of said power transmission.

3. The infinitely variable transmission of claim 1, wherein said shaft force operating means comprises a hydraulic actuator for each of said pulleys, each hydraulic actuator having a hydraulic chamber, to which oil pressure is supplied, and the hydraulic chambers of both hydraulic actuators contain substantially equal effective pressure receiving area.

4. The infinitely variable transmission of claim 1, wherein said shaft force operating means comprises a hydraulic actuator for each of said pulleys, each hydraulic actuator having a hydraulic chamber, to which oil pressure is supplied, and the hydraulic chambers of both hydraulic actuators contain a mutually different effective pressure receiving area.

5. The infinitely variable transmission of claim 3, wherein said neutral control means applies substantially equal oil pressure to said hydraulic chambers of both of said hydraulic actuators.

6. The infinitely variable transmission of claim 3, wherein said neutral control means applies slightly different oil pressure to said hydraulic chambers of both of said hydraulic actuators.

7. The infinitely variable transmission of claim 1, wherein said input torque control means controls said torque source so that said predetermined torque is always in a normal torque state in which torque is always transmitted from the torque source to the wheels, and said difference between shaft forces operating on said primary and secondary pulleys when said output member is stationary approaches zero while remaining positive.

8. The infinitely variable transmission of claim 1, wherein said determination means determines that the pulley ratio of said belt type continuously variable transmission apparatus is within a predetermined range and that said neutral condition is needed when a throttle pedal is not depressed and a brake pedal is depressed.

9. The infinitely variable transmission of claim 1, wherein said torque source is an engine and said input torque control means controls a degree of throttle opening of said engine so that a predetermined torque is output.

* * * * *